(12) United States Patent
Arora et al.

(10) Patent No.: US 11,663,257 B2
(45) Date of Patent: *May 30, 2023

(54) DESIGN-TIME INFORMATION BASED ON RUN-TIME ARTIFACTS IN TRANSIENT CLOUD-BASED DISTRIBUTED COMPUTING CLUSTERS

(71) Applicant: Cloudera, Inc., Santa Clara, CA (US)

(72) Inventors: Sudhanshu Arora, Sunnyvale, CA (US); Mark Donsky, San Francisco, CA (US); Guang Yao Leng, Mountain View, CA (US); Naren Koneru, Fremont, CA (US); Chang She, San Francisco, CA (US); Vikas Singh, San Jose, CA (US); Himabindu Vuppula, Saratoga, CA (US)

(73) Assignee: Cloudera, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/367,194

(22) Filed: Jul. 2, 2021

(65) Prior Publication Data

US 2021/0334301 A1 Oct. 28, 2021

Related U.S. Application Data

(63) Continuation of application No. 16/802,196, filed on Feb. 26, 2020, now Pat. No. 11,086,917, which is a
(Continued)

(51) Int. Cl.
*G06F 16/34* (2019.01)
*G06N 5/04* (2023.01)
(Continued)

(52) U.S. Cl.
CPC ........ *G06F 16/345* (2019.01); *G06F 9/45558* (2013.01); *G06F 16/288* (2019.01);
(Continued)

(58) Field of Classification Search
CPC ..................................................... G06F 16/345
(Continued)

(56) References Cited

U.S. PATENT DOCUMENTS

| 6,369,819 B1 * | 4/2002 | Pitkow | G06F 16/958 |
| | | | 707/E17.116 |
| 6,405,215 B1 | 6/2002 | Yaung | |

(Continued)

OTHER PUBLICATIONS

Duc, Thang Le, et al. "Machine learning methods for reliable resource provisioning in edge-cloud computing: A survey." ACM Computing Surveys (CSUR) 52.5 (2019): 1-39. (Year: 2019).*

(Continued)

*Primary Examiner* — Satish Rampuria
(74) *Attorney, Agent, or Firm* — Perkins Coie LLP

(57) ABSTRACT

Transient computing clusters can be temporarily provisioned in cloud-based infrastructure to run data processing tasks. Such tasks may be run by services operating in the clusters that consume and produce data including operational metadata. Techniques are introduced for tracking data lineage across multiple clusters, including transient computing clusters, based on the operational metadata. In some embodiments, operational metadata is extracted from the transient computing clusters and aggregated at a metadata system for analysis. Based on the analysis of the metadata, operations can be summarized at a cluster level even if the transient computing cluster no longer exists. Further relationships between workflows, such as dependencies or redundancies, can be identified and utilized to optimize the provisioning of computing clusters and tasks performed by the computing clusters.

19 Claims, 24 Drawing Sheets

Related U.S. Application Data continuation of application No. 15/943,603, filed on Apr. 2, 2018, now Pat. No. 10,635,700, which is a continuation-in-part of application No. 15/808,805, filed on Nov. 9, 2017, now Pat. No. 10,514,948.

(51) Int. Cl.
*G06F 9/455* (2018.01)
*G06F 16/38* (2019.01)
*G06F 16/28* (2019.01)
*G06F 16/182* (2019.01)

(52) U.S. Cl.
CPC ............... *G06F 16/38* (2019.01); *G06N 5/04* (2013.01); *G06F 16/182* (2019.01); *G06F 2009/4557* (2013.01)

(58) Field of Classification Search
USPC ...................................................... 718/1–108
See application file for complete search history.

(56) References Cited

U.S. PATENT DOCUMENTS

| | | | | |
|---|---|---|---|---|
| 6,621,505 | B1* | 9/2003 | Beauchamp | G06Q 10/10 |
| | | | | 719/329 |
| 6,742,020 | B1* | 5/2004 | Dimitroff | G06F 16/27 |
| | | | | 709/224 |
| 6,842,906 | B1 | 1/2005 | Bownman-Amuah | |
| 6,901,405 | B1 | 5/2005 | Mccrady et al. | |
| 6,950,753 | B1* | 9/2005 | Rzhetsky | G16H 70/60 |
| | | | | 702/19 |
| 6,990,238 | B1* | 1/2006 | Saffer | G06K 9/6218 |
| | | | | 707/E17.093 |
| 7,007,275 | B1* | 2/2006 | Hanson | G06F 9/5055 |
| | | | | 709/201 |
| 7,185,046 | B2 | 2/2007 | Ferstl et al. | |
| 8,074,218 | B2 | 12/2011 | Eilam et al. | |
| 8,978,034 | B1* | 3/2015 | Goodson | G06F 16/21 |
| | | | | 718/101 |
| 9,015,118 | B2 | 4/2015 | Velasco | |
| 10,514,948 | B2 | 12/2019 | Singh et al. | |
| 10,635,700 | B2 | 4/2020 | Arora et al. | |
| 11,086,917 | B2 | 8/2021 | Arora et al. | |
| 2008/0072290 | A1 | 3/2008 | Metzer et al. | |
| 2015/0347193 | A1 | 12/2015 | Wolfson et al. | |
| 2016/0267082 | A1* | 9/2016 | Wong | G06F 16/164 |
| 2018/0322606 | A1 | 11/2018 | Das et al. | |
| 2018/0357333 | A1 | 12/2018 | Isherwood et al. | |

OTHER PUBLICATIONS

Katyal, Mayanka, and Atul Mishra. "A comparative study of load balancing algorithms in cloud computing environment." arXiv preprint arXiv:1403.6918 (2014).pp. 6-14 (Year: 2014).*

Aoun, Rosy, Elias A. Doumith, and Maurice Gagnaire. "Resource provisioning for enriched services in cloud environment." 2010 IEEE Second International Conference on Cloud Computing Technology and Science. IEEE, 2010.pp. 296-303 (Year: 2010).*

Shahand, Shayan, Antoine HC van Kampen, and Silvia Delgado Olabarriaga. "Science gateway canvas: A business reference model for science gateways." Proceedings of the 1st Workshop on The Science of Cyberinfrastructure: Research, Experience, Applications and Models. 2015.pp. 45-52 (Year: 2015).*

Viriyasitavat, Wattana, and Andrew Martin. "A survey of trust in workflows and relevant contexts." IEEE Communications Surveys & Tutorials 14.3 (2011): pp. 911-940. (Year: 2011).*

Görg, Torsten. "A Model-Based Approach to Type-3 Clone Elimination." Softwaretechnik-Trends 32.2 (2012): pp. 1-2. (Year: 2012).*

Baker et al., "Grids and Grid technologies for wide-area distributed computing", Software: Practice and Experience 32.15, 2002, pp. 1437-1466.

Sagiroglu et al., "Big data: A review", IEEE international conference on collaboration technologies and systems (CTS), 2013, pp. 42-47.

Augerat et al., "Scalable monitoring and configuration tools for grids and clusters", IEEE Proceedings 10th Euromicro Workshop on Parallel, Distributed and Network-based Processing, 2002, pp. 147-153.

Backes, et al., "Data Lineage in Malicious Environments", IEEE Transactions on Dependable and Secure Computing, vol. 13, No. 2, Mar./Apr. 2016; pp. 178-191.

Cui et al., "Lineage tracing for general data warehouse transformations," The VLDS Journal—The International Journal on Very Large Data Bases, 12.1, 2003, pp. 41-58.

Dorn, et al., "A survey of B2B methodologies and technologies: From business models towards deployment artifacts." 40th Annual Hawaii International Conference on System Sciences (HICSS '07), IEEE, 2007, pp. 1-10.

Lim et al., "Prospective and retrospective provenance collection in scientific workflow environments." IEEE International Conference on Services Computing, 2010, pp. 449-456.

Sheth et al., "Report from the NSF workshop on workflow and process automation in information systems." ACM SiGMOD Record 25.4 (1996); pp. 55-67.

Woodruff, et al., "Supporting Fine-Grained Data Lineage in a Database Visualization Environment," IEEE Proceedings 13th International Conference on Data Engineering, 1997, pp. 91-102.

Berrick, Stephen W., et al. "Giovanni: a web service workflow-based data visualization and analysis system." IEEE Transactions on Geoscience and Remote Sensing 47.1 (2008), pp. 106-113.

Wang, Shaowen, et al. "Toward provenance-aware geographic information systems." Proceedings of the 16th ACM SIGSPATIAL international conference on Advances in geographic information systems, 2008, pp. 1-4.

* cited by examiner

DESIGN-TIME INFORMATION BASED ON RUN-TIME ARTIFACTS IN TRANSIENT CLOUD-BASED DISTRIBUTED COMPUTING CLUSTERS

CROSS-REFERENCE TO RELATED APPLICATION(S)

The application is a continuation of U.S. patent application Ser. No. 16/802,196, entitled "DESIGN-TIME INFORMATION BASED ON RUN-TIME ARTIFACTS IN TRANSIENT CLOUD-BASED DISTRIBUTED COMPUTING CLUSTERS," filed Feb. 26, 2020, which is a continuation of U.S. patent application Ser. No. 15/943,603, entitled "DESIGN-TIME INFORMATION BASED ON RUN-TIME ARTIFACTS IN TRANSIENT CLOUD-BASED DISTRIBUTED COMPUTING CLUSTERS," filed Apr. 2, 2018, now U.S. Pat. No. 10,635,700, which is a continuation-in-part of U.S. patent application Ser. No. 15/808,805, entitled "DESIGN-TIME INFORMATION BASED ON RUN-TIME ARTIFACTS IN A DISTRIBUTED COMPUTING CLUSTER," filed Nov. 9, 2017, now U.S. Pat. No. 10,514,948, all of which applications are hereby incorporated by reference in their entireties.

TECHNICAL FIELD

The present disclosure generally relates to distributed computing clusters and, more particularly, to collection, visualization, and utilization of data lineage in distributed computing clusters.

BACKGROUND

Traditional data warehouse systems employ a "top down" or "schema on write" approach to collect and store data according to a predefined schema. A predefined schema can provide a logical structure to the data that can enable efficient reporting and analysis in some situations. However, a "schema on write" approach to data processing requires a substantial investment in initial planning and design to come up with the schema that will be utilized to organize the data. Effective planning and design will typically require comprehensive knowledge of the data to be collected, the users and organizations that will utilize the data, and the purposes and goals of using the data. As the scale of data being stored and processed continues to increase and the manner in which such data is used continues to evolve, data warehouse systems implementing a "schema on write" approach become increasingly more difficult to design, more cumbersome to manage, and more difficult to change to adapt to user needs.

A bottom up or "schema on read" approach differs from the "schema on write" approach used in traditional data warehouses in that the schema used to organize and process the data is only applied at the time of reading the data. In other words, structure is applied to otherwise unstructured data when it is read, for example, to query the data or perform other processing jobs. Large scale data technologies, such as Apache Hadoop™, typically employ this "schema on read" approach to allow users to effectively utilize large amounts of unstructured data without having to invest the time and effort to create a predefined schema for structuring the data when writing the data to storage. However, as the amount of data grows exponentially, there is a need for automatic collection, visualization, and utilization of upstream and downstream data lineage in these distributed database system (e.g., to verify the system's reliability or to further optimize or reconfigure the system).

DETAILED DESCRIPTION

Figure 1:
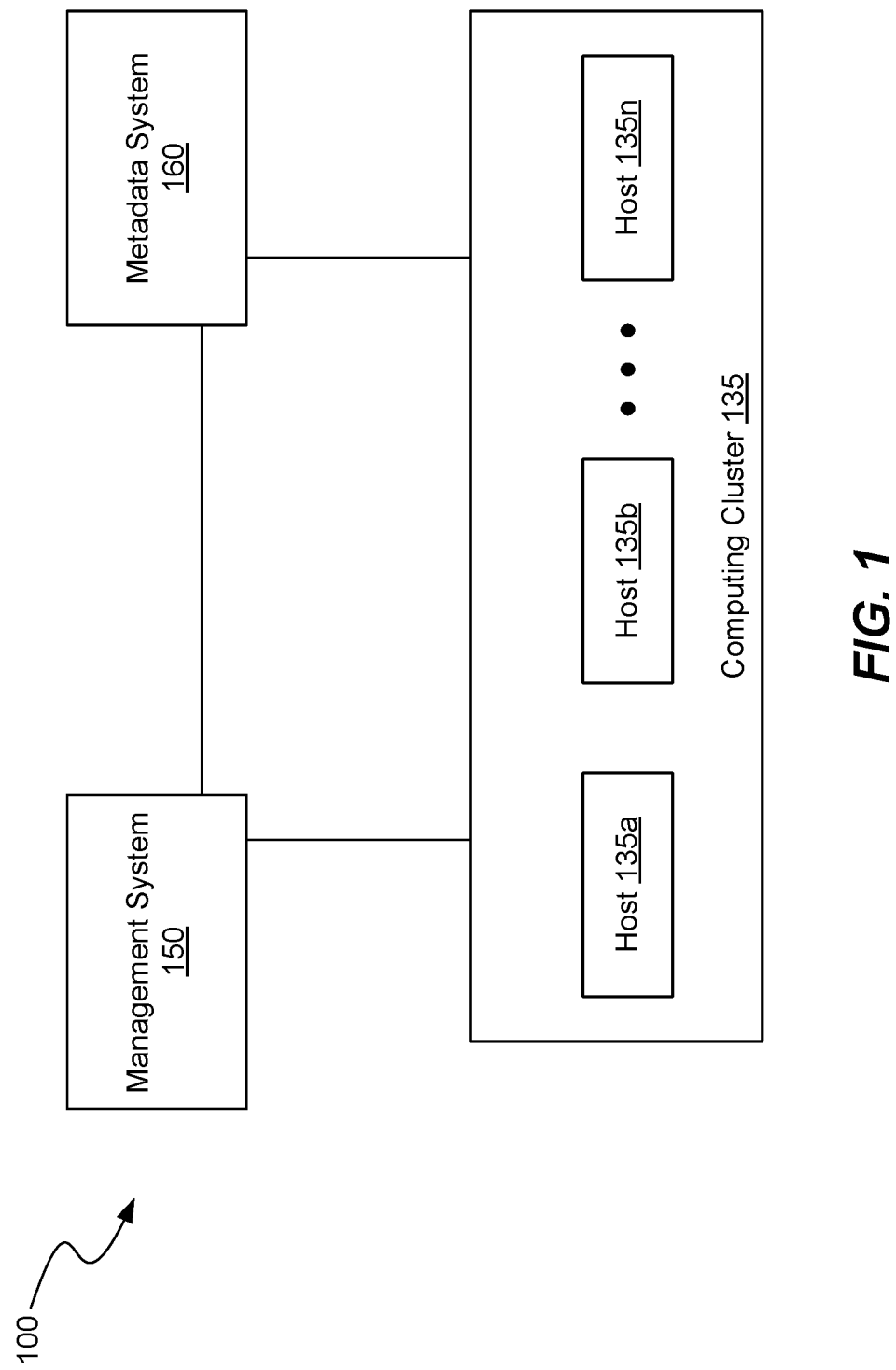
FIG. 1 is a block diagram illustrating an example operating environment in which a disclosed technique for inferring design-time information based on run-time artifacts can be implemented.

From the foregoing, it will be appreciated that specific embodiments of the invention have been described herein for purposes of illustration, but that various modifications may be made without deviating from the scope of the invention.

Overview

Implementing a bottom up or "schema on read" approach to data processing, for example, through the use of Apache Hadoop™, can allow users to gain effective insight from large amounts of their unstructured data relatively quickly. Such a system allows users to load their data in without predefined schema and perform work on the data. A drawback to this arrangement is that users are left with relatively little understanding of the data they have stored, the data used to return certain results, the structuring of data in returning certain results, and the operations performed to return certain results, etc. For example, a given workflow involved in the processing of data in a distributed computing cluster implementing a Hadoop™ architecture to return a result may involve a complex sequence of multiple data processing jobs executed on multiple data sets using multiple different services.

To address the challenges described above, a technique is introduced that enables automatic collection, visualization, and utilization of upstream and downstream data lineage in a data processing system, so as to provide users with visibility into the data processing system that utilizes a "schema on read" approach (e.g., Hadoop™). In some implementations, the collection, visualization and utilization can be based at least in part on operational metadata generated by the system when processing their data. For example, for each data source, the technique introduced here can show, down to the column level within that data source, what the precise upstream data sources were, the transforms performed to produce it, and the impact that data has on downstream artifacts. Additionally, a lineage diagram, which is a directed graph that depicts an extracted entity and its relations with other entities, can be displayed to users as an intuitive tool to further utilize, reuse, reconfigure, or optimize the existing data processing system.

Specifically, the embodiments introduced here can infer design-time information based on run-time artifacts. The term "design-time information" in this context refers to any information regarding the design of a system in general (e.g., computing devices, services, file systems, etc.) configured to store and process the data, the design of applications of the system (e.g., jobs, workflows, projects, etc.) to process data, and/or any other design-time information. For example, design-time information may include information on tables (and associated columns) utilized to structure the data, information on jobs (e.g., job resource objects) utilized to execute jobs on the data, information on workflows (e.g., job sequences, workflow definition objects, etc.) utilized to perform sequences of jobs, information on projects or applications that make use of the data processing, information on services utilized to process data, information on resources (e.g., physical devices, software, etc.) utilized to process data, etc. Again, in a system such as Hadoop™ implementing a "schema on read" approach, much of this information is not visible to the user. The user may load their data, define the result they are looking for, and the system may define, for example, how to structure the workflow to arrive at the intended result. The term "run-time artifacts" generally refers to the metadata generated at the time of processing data (i.e., at run-time). In specific embodiments, the run-time artifacts are generated by services and/or entities involved in the processing of the data in a computing cluster. Examples of run-time artifacts include a log generated by a service implemented to process a job, a temporary table generated by a service to process the job, etc.

As is described further below, this process of inferring design-time information based on run-time artifacts opens up a number of possibilities to a user such as a data administrator or data scientist to more effectively manage their data and manage the manner in which the data is utilized. Example applications include recreating jobs or workflows (or multiple versions of jobs or workflows) based on the inferred design-time information, tracking the use of sensitive data such as personally identifiable information (PII), optimizing workflows, etc.

Example Operatinsg Environment

FIG. 1 is a block diagram illustrating an example operating environment 100 in which the disclosed techniques for inferring design-time information based on run-time artifacts can be implemented. As shown in FIG. 1, the example operating environment includes a computing cluster 135, a management system 150, and a metadata system 160.

The computing cluster 135 may represent a logical entity that includes sets of host machines ("hosts") 135a-n that run instances of services configured for distributed processing of data. In an example embodiment, the computing cluster 135 may comprise an Apache Hadoop™ deployment. Apache Hadoop™ is an open-source software framework for reliable, scalable and distributed processing of large data sets across clusters of commodity machines. Examples of services include the Apache Hadoop™ Distributed File System (HDFS), MapReduce™, Apache Hadoop™ YARN, and/or the like. Services of the computing cluster 135 are described in more detail with respect to FIG. 2. A host (e.g., hosts 135a-n), as used herein, can include a physical and/or virtual machine that runs an instance of a role. As used herein, a role is a category of functionality within a service. For example, the Apache™ HDFS service can have the following example roles: a NameNode, a secondary NameNode, DataNode and balancer. In a distributed system such as computing cluster 135, one service may run on multiple hosts.

In some embodiments, a management system 150 is communicatively coupled to the computing cluster 135. The management system 150 can perform various roles for managing the operation of the computing cluster. For example, the management system 150 can be configured for installing software, configuring, starting, and stopping services in the cluster 135, and managing the hosts 135a-n of the cluster 135 on which the services run. Components of the example management system 150 are described in more detail with respect to FIG. 3.

In some embodiments, a metadata system 160 is communicatively coupled to the computing cluster and/or the management system 150. As will be described in more detail herein, the metadata system 160 can be configured to extract metadata associated with the architecture and operation of the computing cluster 135 and provide certain analytics and insights based on that metadata. More specifically, the metadata system 160 can utilize extracted metadata to identify entities associated with the processing of data in the computing cluster 135 and the operational relationships between these entities. An "entity" in this context can include, for example, a file, a directory, a table, a script, a script execution, a query template, a query execution, a job template, a job execution, etc. The identified entities and entity relationships can, in some embodiments, be utilized to determine or trace the flow of information through the computing cluster 135. This flow of information is referred to herein as data lineage. For example, a data lineage for a piece of data source may indicate the upstream data sources and operations performed to produce it, and the impact that that data has on downstream artifacts. Components of the example metadata system 160 are described in more detail with respect to FIGS. 4A-4B.

The various systems shown in the example operating environment 100 may include one or more computing machines (physical and/or virtual) that comprise any combination of hardware and software configured to implement the various logical components described herein. For example, the one or more computing machines may include one or more memories that store instructions for implementing the various components described herein, one or more hardware processors configured to execute the instructions stored in the one or more memories, and various data repositories in the one or more memories for storing data structures utilized and manipulated by the various components. As an example, the one or more computing machines may include components such as those of example computer system 1600 described with respect to FIG. 16.

In some embodiments, the one or more computing machines of the various systems of example operating environment 100 may communicate with each other over one or more networks (not shown). The one or more networks may include any combination of networks over which data can be communicated. For example, the one or more networks may include LANs, WANs, cellular networks (e.g., LTE, HSPA, 3G, and other cellular technologies), and/or networks using any of wired, wireless, terrestrial microwave, or satellite links, and may include the public Internet.

Figure 2:
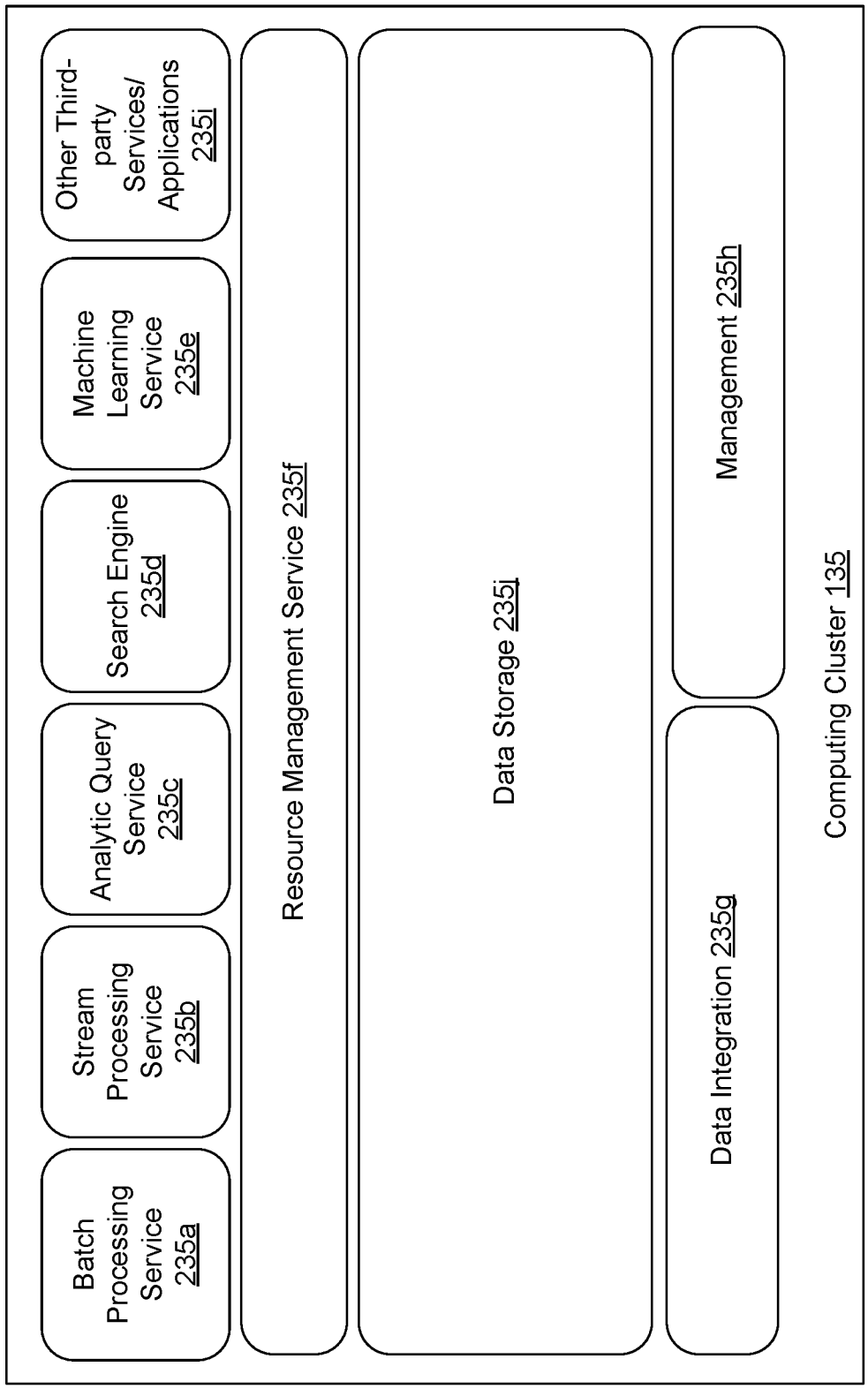
FIG. 2 is a block diagram showing some example services that may be deployed in a computing cluster.

FIG. 2 is a block diagram showing some example services that may be deployed in the computing cluster 135 described with respect to FIG. 1. Note that the term "services" is used herein uniformly for simplicity to refer to various components of the distributed computing cluster 135 described with respect to FIG. 2; however, one or more of the described "services" may include, for example, file systems (e.g., Apache™ HDFS), processing engines (e.g., MapReduce™, Apache Spark™, etc.), query interfaces (e.g., Apache Hive™), resource managers (e.g., Apache Hadoop™ YARN), and other types of components implemented in hardware and/or software. As shown in FIG. 2, the computing cluster 135 may include one or more batch processing services 235*a* (e.g., MapReduce™, Apache Hive™, Apache Pig™, etc.) one or more stream processing services 235*b* (e.g., Apache Spark™), one or more analytic query services 235*c* (e.g., Apache Impala™, etc.), one or more search engines 235*d* (e.g., Cloudera™ Search, etc.), one or more machine learning services 235*e* (e.g., Apache Spark™, MapReduce™, Apache Mahout™, etc.), one or more resource management services 235*f* (e.g., Apache Hadoop™ YARN), one or more data interface/integration services 235*g* (e.g., Apache Sqoop™), one or more management services 235*h* (e.g., part of or associated with the management system 150), and one or more other third-party services and apps 235*i*. The computing cluster 135 also includes one or more storage services 235*j* for handling the storage of any type of data. The storage services 235*j* may include a distributed file system such as Apache™ HDFS, database frameworks such as Apache HBase™, Amazon™ S3, EMC Isilon™, etc. As previously mentioned, each of the one or more services described with respect to FIG. 2 may include instances running on multiple hosts 135*a-n* in the computing cluster 135. Further, each service may include multiple roles representing categories of functionality. For example, an Apache™ HDFS service may include the following roles: NameNode, secondary NameNode, DataNode, balancer. Accordingly, a given host of the multiple hosts 135*a-n* may include instances of a particular role associated with a given service. Returning to the example of the Apache™ HDFS service, one or more of the hosts 135*a-n* may include a respective role instance of the Apache™ HDFS service (e.g., DataNode_a, DataNode_b, . . . DataNode_n).

Figure 3:
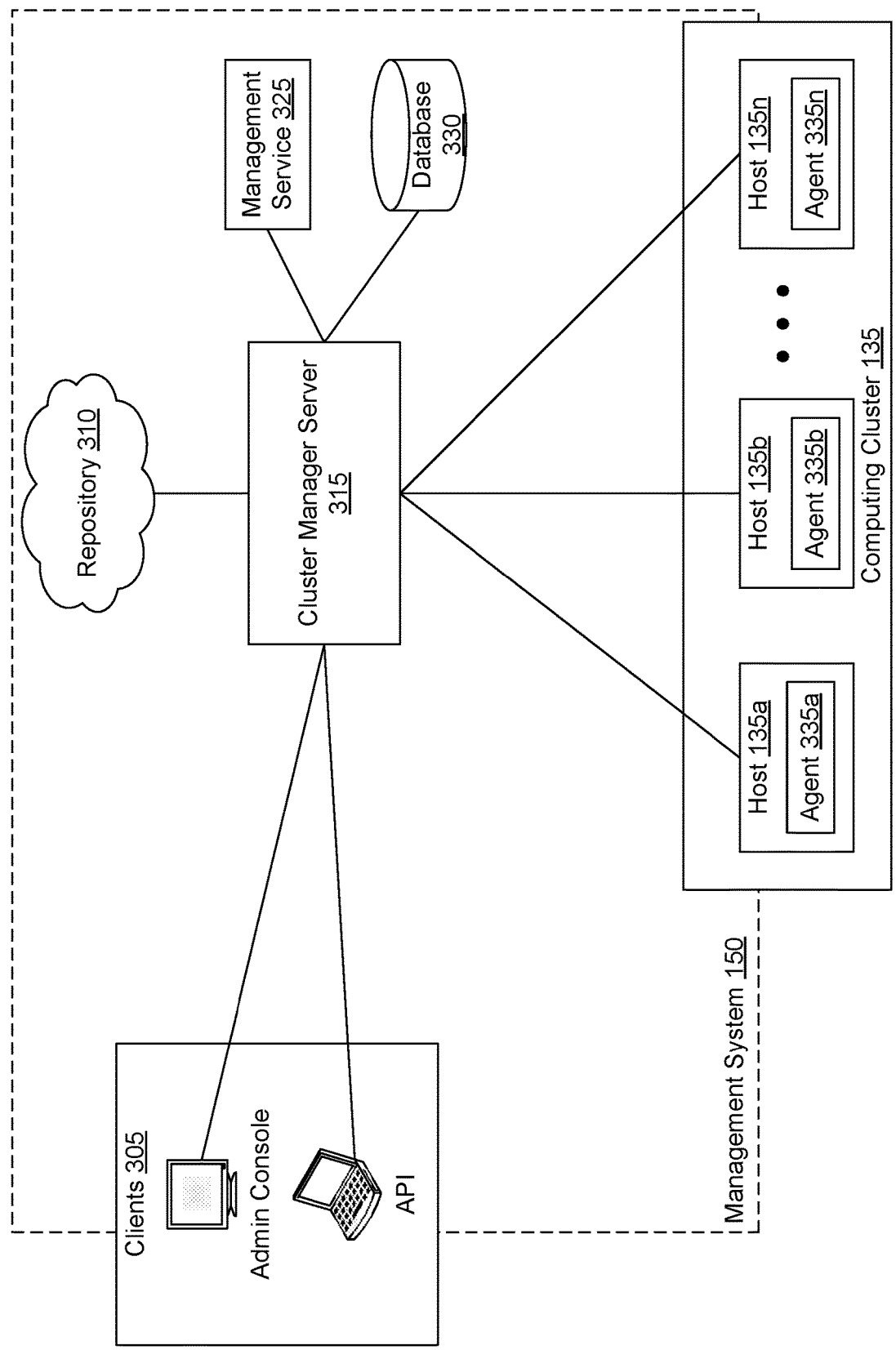
FIG. 3 is a block diagram illustrating an example management system.

FIG. 3 is a block diagram that shows the components of the example management system 150 described with respect to FIG. 1. In some embodiments, a cluster manager server 315 can be in communication with a management service 325 that consists of a set of roles, for example, an activity monitor, a host monitor, a service monitor, reports manager, and/or the like. Configuration information (e.g., cluster configuration information), monitoring information, and/or other information associated with the computing cluster 135 can be stored in a database 330. The database 330 can include multiple logical databases running across one or more database servers. In some embodiments, the client 305 represents an interface for interacting with the cluster manager server 315. The client 305 can include an admin console which may be a web-based user interface (UI) or graphical user interface (GUI) that an administrator ("admin") can use to interact with the cluster manager server 315 and manage one or more clusters (e.g., computing cluster 135). The client 305, in some embodiments, can also include one or more application programming interfaces (APIs) used by other applications to manage the cluster. Software for use in the computing cluster 135 can be stored in a repository 310 for distribution by the cluster manager server 315.

In some embodiments, each of the hosts 135*a-n* of the computing cluster 135 includes an agent 335*a-n* for facilitating communication and coordination between processes running at the cluster manager server 315 and the multiple hosts 135*a-n* of the computing cluster 135. For example, the agent 335*a-n* may be responsible for starting and stopping processes, unpacking configurations, triggering installations, and monitoring the respective hosts 135*a-n*. Through communicating with the cluster manager server 315, the various agents 335*a-n* may facilitate the coordinated operation of multiple role instances of a given service of the computing cluster 135. Communication between the agents 335*a-n* and the cluster manager server 315 may be accomplished using heartbeats. For example, each of the one or more agents 335*a-n* may transmit a heartbeat signal at regular (e.g., every 15 seconds) or irregular intervals to the cluster manager server 315. With each heartbeat signal, an agent 335*a-n* may notify the cluster manager server 315 of its activities. The cluster manager server 315 may, in turn, respond with instructions on what activities the agent 335*a-n* should be performing. This exchange may include some type of reconciliation.

Figure 4A:
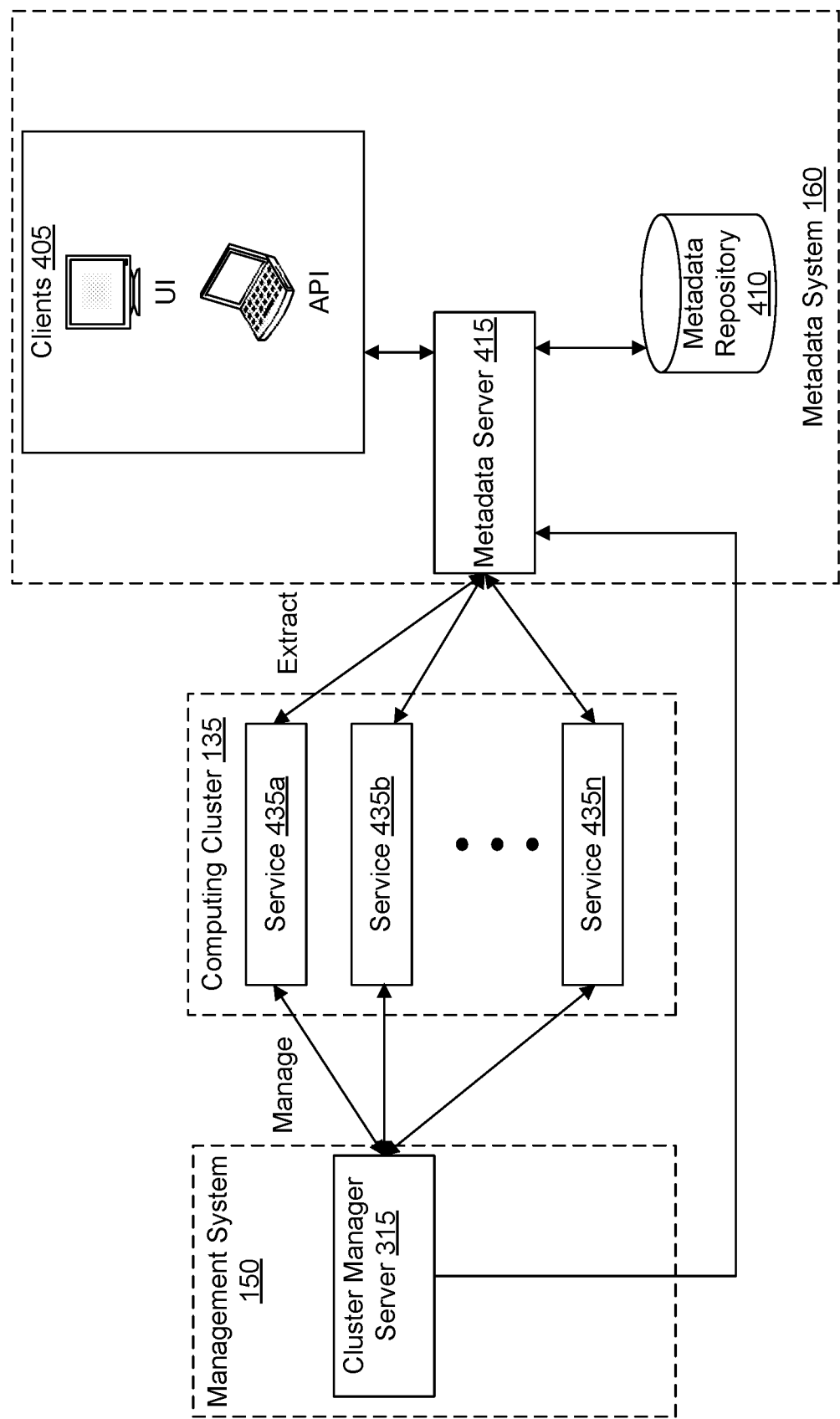
FIG. 4A is a block diagram that illustrates at a high-level interaction between components of a metadata system with components of a distributed computing cluster and management system.

FIG. 4A is a block diagram that illustrates, at a high level, an example interaction between components of a metadata system 160 with components of the computing cluster 135 and management system 135. As discussed with respect to FIG. 3, the cluster manager server 315 operates to manage one or more services 435*a-n* operating in the computing cluster 135. The one or more services 435*a-n* shown in FIG. 4A may correspond with the services 235*a-g* described with respect to FIG. 2. The metadata system 160 operating in conjunction with the management system 150 may extract metadata from the one or more services 435*a-n* operating in the computing cluster 135. Specifically, in some embodiments, the metadata system 160 may include a metadata server 415 configured to perform various functions related to the collection, storage, analysis, and presentation of metadata from the computing cluster 135. For example, in some embodiments, the metadata server 415 communicates with the cluster manager server 315 to obtain information regarding the one or more services 435*a-n* operating in the computing cluster 135. Based on information obtained from the cluster manager server 315, the metadata server 415 may cause the extraction of metadata associated with entities managed by the one or more services 435*a-n*. Extraction of metadata may be continuous, in response to certain events, or at regular or irregular intervals. As part of the metadata extraction process, the metadata server 415 may also manage and apply various metadata extraction policies. The metadata server 415 then indexes and stores the extracted metadata into a metadata repository 410 that is accessible to clients 405 via services offered by the metadata system 160. To enable access by clients 405, the metadata server 415 manages user authorizations, performs analytic services (e.g., data lineage), and implements a user interface and/or API through which outputs (e.g., reports, visualizations, search results, etc.) generated based on the metadata can be accessed by clients 405. Note that although shown as a single entity in FIG. 4A, the metadata server 415 may represent multiple physical and/or virtual computing entities.

Figure 4B:
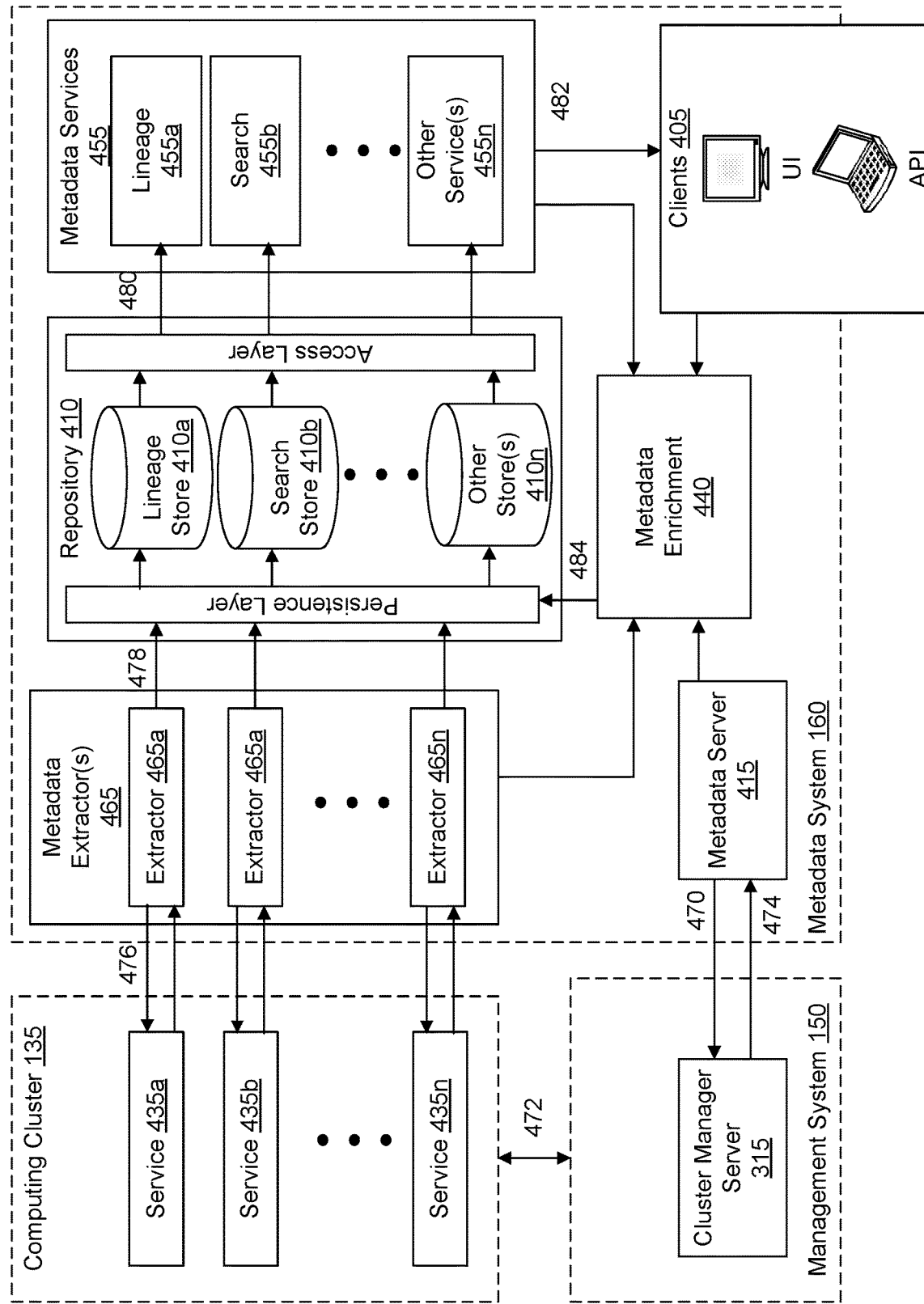
FIG. 4B is a block diagram that illustrates components of a metadata system as well as an example process flow for extracting, indexing, storing, and utilizing metadata.

FIG. 4B is a block diagram that shows the components of a metadata system 160 in greater detail as well as an example process flow involving the components of the metadata system 160. The process flow described with respect to FIG. 4B is provided for illustrative purposes and is not to be construed as limiting. Other embodiments may include process flows that include more or fewer steps, perform steps in a different order, or involve different system components while remaining within the scope of the present disclosure.

The example process begins at step 470 with the metadata server 415 contacting the cluster manager server 315 for information regarding the one or more services 435*a-n* operating in the computing cluster 135. Recall that the one or more services 435*a-n* may correspond with the services 235*a-g* described with respect to FIG. 2. Information regarding the one or more services 435*a-n* operating in the computing cluster 135 may include identification of the services operating (including specific service instances at the various hosts 135*a-n* in the cluster), parameters associated with the one or more services, a listing of the files stored in a data storage system 235*i* (e.g., Apache™ HDFS), and/or any other information regarding the computing cluster 135.

In some cases, the cluster manager server 315 may already have the information requested by the metadata server 415 stored in a database 330, for example, as described with respect to FIG. 3. Alternatively, or in addition, the cluster manager server 315 may request information from one or more of the services 435*a-n*, for example, by communicating, at step 472, with one or more of the agents 335*a-n* operating at the hosts 135*a-n* (respectively) in the computing cluster 135.

At step 474, the cluster manager server 315 returns the information associated with the one or more services 435*a-n* to the requesting metadata server 415. This process of retrieving, by the metadata server 415, information associated with the one or more services 435*a-n* may be performed at an initial setup stage, in response to events in the computing cluster 135, and/or at regular or irregular intervals. For example, in an embodiment, after an initial set-up stage, the metadata server 415 may continually (at regular or irregular intervals) receive updated information regarding the services 435*a-n* from the cluster manager server 315.

With the retrieved information associated with the one or more services 435*a-n*, the metadata server 415 may initiate the extraction of metadata from the one or more services 435*a-n* by one or more metadata extractors 465. The metadata extractors 465 may represent one or more processing entities operating in the metadata system 160 that are configured to request, receive, pull or otherwise extract metadata from the one or more services 435*a-n*. For example, as shown in FIG. 4B, multiple extractor instances 465*a-n* may operate to, at step 476, extract metadata from the one or more services 435*a-n*. Note that the metadata extractors 465*a-n* are depicted in FIG. 4B as separate from the metadata server 415 for illustrative clarity. However, this arrangement is not to be construed as limiting. The metadata extractors 465*a-n* may be separate from the metadata server 415 or may be part of the metadata server 415.

In the example depicted in FIG. 4B, each of services 435*a-n* is associated with a corresponding extractor process 465*a-n*. In such an embodiment, each extractor may be specifically configured (e.g., using information retrieved from the cluster manager server 315) to extract metadata from a particular service operating in the computing cluster 135. For example, extractor 465*a* may be an Apache Hive™ extractor specifically configured to extract metadata from an Apache Hive™ service 435*a* operating in the computing cluster 135. Note that the quantity of extractor entities 465*a-n* need not be the same as the quantity of services 435*a-n*. In some embodiments, a single extractor entity 465*a-n* may extract metadata from multiple services 435*a-n* and/or multiple extractor entities 465*a-n* may extract metadata from a single service 435*a-n*. As indicated by the bidirectional arrows at step 476, extraction of metadata may include pulling, by the extractors 465*a-n*, metadata from the services 435*a-n* and/or pushing, by the services 435*a-n*, metadata to the extractors 465*a-n*. Again, as discussed with respect to steps 470-474, the extraction of metadata at step 476 may be performed at an initial setup stage, in response to events in the computing cluster 135, and/or at regular or irregular intervals. For example, in an embodiment, after an initial set up stage, the extractors 465*a-n* may continually (at regular or irregular intervals) extract metadata from the services 435*a-n* as new metadata is generated.

The type of metadata extracted from the one or more services 435*a-n* may depend on the types or roles of the services 435*a-n* and/or the specific configuration of the metadata system 160. Examples of the type of metadata extracted from the one or more services 435*a-n* are described in the following paragraphs with reference to some of the example services 235*a-j* of FIG. 2.

One or more of the extractors 465*a-n* may be configured to extract metadata from a batch processing service 235*a* (e.g., Apache Hive™, Apache Pig™, or MapReduce™) associated with the computing cluster 135. In such an embodiment, extracted metadata may include database metadata, table metadata, query metadata, processing logs, processing scripts, etc. For example, in the case of Apache Hive™, the one or more extractors 465*a-n* may be configured to extract metadata from generated Apache Hive™ lineage logs. In the case of Apache Pig™, the one or more extractors 465*a-n* may be configured to extract metadata in the form of script runs from a job tracker or an application history server associated with Apache Hadoop™ YARN. Similarly, in the case of MapReduce™, the one or more extractors 465*a-n* may be configured to extract metadata from a job tracker or job history server associated with MapReduce™. In some embodiments, the one or more extractors 465*a-n* may be configured to extract batch processing service 235*a* metadata at an initial setup stage, in response to events associated with the batch processing service 235*a* (e.g., processing requests, processing completion, etc.), and/or at regular or irregular intervals.

One or more of the extractors 465*a-n* may also be configured to extract metadata from a stream processing service 235*b* (e.g., Apache Spark™, etc.) associated with the computing cluster 135. In such an embodiment, extracted metadata may include database metadata, table metadata, query metadata, processing logs, processing scripts, etc. In the case of Apache Spark™, the one or more extractors 465a-n may be configured to extract Apache Spark™ job metadata from Apache Hadoop™ YARN logs. In some embodiments, the one or more extractors 465a-n may be configured to extract stream processing service 235b metadata at an initial setup stage, in response to events associated with the stream processing service 235b (e.g., processing requests, processing completion, etc.), and/or at regular or irregular intervals.

One or more of the extractors 465a-n may also be configured to extract metadata from an analytic query service 235c (e.g., Impala™, etc.) associated with the computing cluster 135. In such an embodiment, extracted metadata may include database metadata, table metadata, query metadata, processing logs, processing scripts, etc. In the case of Impala™, the one or more extractors 465a-n may be configured to extract analytic query service 235c metadata from Impala™ daemon lineage logs. In some embodiments, the one or more extractors 465a-n may be configured to extract analytic query service 235c metadata at an initial setup stage, in response to events associated with the analytic query service 235c (e.g., submitted queries, completed query processing, etc.), and/or at regular or irregular intervals.

One or more of the extractors 465a-n may also be configured to extract metadata from a resource management service 235f (e.g., Apache Hadoop™ YARN) associated with the computing cluster 135. In such an embodiment, extracted metadata may include resource metadata (e.g., from hosts 135a-n), job metadata, processing logs, etc.). In the case of Apache Hadoop™ YARN, the one or more extractors 465a-n may be configured to extract resource management service 235f metadata from a resource manager associated with the computing cluster 135. In some embodiments, the one or more extractors 465a-n may be configured to extract resource management service 235f metadata at an initial setup stage, in response to events associated with the resource management service 235f (e.g., resource allocations, etc.), and/or at regular or irregular intervals.

One or more of the extractors 465a-n may also be configured to extract metadata from a data interface/integration service 235g (e.g., Apache Sqoop™) associated with the computing cluster 135. In such an embodiment, extracted metadata may include database metadata, table metadata, query metadata, processing logs, processing scripts, etc. In the case of Apache Sqoop™, the one or more extractors 465a-n may be configured to extract database and table metadata from an Apache Hive™ metastore server using an API and/or extract Apache Hive™ queries using Apache Hive™ lineage logs. In some embodiments, the one or more extractors 465a-n may be configured to extract data interface/integration service 235g metadata at an initial setup stage, in response to events associated with the data interface/integration service 235g (e.g., data ingestion, data extraction, etc.), and/or at regular or irregular intervals.

One or more of the extractors 465a-n may also be configured to extract metadata from a data storage service 235j (e.g., Apache™ HDFS, Apache HBase™) associated with the computing cluster 135. In such an embodiment the one or more extractors 465a-n would extract metadata from the data storage service 235j such as file listings, version information, storage type (e.g., NameNode, JournalNode, etc.), file creation time, file edit logs, checkpoint information, data storage system configuration properties, etc. In some embodiments, the one or more extractors 465a-n may be configured to extract data storage service 235j metadata at an initial setup stage, in response to events associated with the data storage service 235j (e.g., read, write, edit, delete, etc.), and/or at regular or irregular intervals. In a high availability Apache™ HDFS implementation, metadata may be extracted as soon as it is written to journal nodes.

As alluded to in the previous paragraphs, the manner in which metadata is extracted may depend on the types of services 435a-n implemented in a given computing cluster 135. Accordingly, to facilitate the extraction of metadata, the cluster manager server 315 and/or metadata server 415 may take over control of the generation of at least some of the metadata generated by any one or more of the services 435a-n. Specifically, the cluster manager server 315 and/or metadata server 415 may specifically define the type and format of the metadata generated so as to coincide with the requirements of a given implementation of the metadata system 160. Again, the requirements of the metadata system 160 may differ, for example, based on user preferences, the configuration of the management system 150, and/or the configuration of the computing cluster 135. As an illustrative example, the cluster manager server 315 and/or metadata server 415 may configure Apache Hive™ such that specific information is stored in a log file in a specific format in response to detecting the submission of a query. As mentioned above, this process of taking over at least some control of the generation of metadata by the one or more services 435a-n may be performed by the cluster manager server 315 and/or metadata server 415. In some embodiments, any one of these two entities may handle the entire process. In some embodiments, the two entities may coordinate with each other. For example, the metadata server 415 may transmit metadata requirements to the cluster manager server 315 which interprets the requirements and takes over at least some control of the generation of metadata by the one or more services 435a-n so as to satisfy the requirements. In some embodiments, a processing entity (e.g., software code) originating from the metadata system 160 may be instantiated at the cluster manager server 315 (or some other component of the management system 150) to take over at least some control of the generation of metadata by the one or more services 435a-n.

Metadata extracted by the one or more extractors 465a-n is then indexed and stored at step 478. Indexing and storage of the extracted metadata enables the metadata to be accessed, for example, for processing and/or search by one or more services 455 of the metadata system 160. In some embodiments, multiple types of metadata are indexed such as identified entities, entity properties, and identified relationships between entities.

The term "entity" in this context refers to any type of entity that is involved in the storage and/or processing of data in the computing cluster 135. The entities may be identified and utilized for indexing based on the metadata extracted from the computing cluster 135. Examples of entities may include files (e.g., Apache™ HDFS files), directories (e.g., Apache™ HDFS directories), tables (e.g., Apache Pig™, Apache Hive™, and Apache Impala™ tables), scripts (e.g., Apache Pig™ scripts), script executions (e.g., Apache Pig™ script executions), query templates (e.g., Apache Hive™ and Apache Impala™ query templates), query executions (e.g., Apache Hive™ and Apache Impala™ query executions), job templates (e.g., Apache Spark™, MapReduce™, Apache Hadoop™ YARN, Apache Sqoop™, and Apache Oozie™ job templates), job executions (e.g., Apache Spark™, MapReduce™, Apache Hadoop™ YARN, Apache Sqoop™, and Apache Oozie™ job executions), devices (e.g., host devices, client devices, etc.), users (e.g., client users, administrative users, etc.), addresses, and any other entities that may be associated with the storage and/or processing of data in the computing cluster 135.

Entity properties may refer to any type of properties associated with entities. Examples of entity properties include name, description, group, owner, type, operation type, source, timestamp, etc. As an illustrative example, an Apache™ HDFS file entity may include the following entity properties: file identifier, file system path, permissions, size, replication state, date, owner, etc. As another illustrative example, a MapReduce™ job execution entity may include the following entity properties: job identifier, mapper class identifier, output key identifier, output value, reducer class identifier, etc. As another illustrative example, an operation entity may include the following properties: input (e.g., a file, a directory, a table, etc.), output (e.g., a file, a directory, a table, etc.), operation type (e.g., transform, join, etc.), operation engine type (e.g., MapReduce™, Apache Spark™, etc.).

Relationships between entities may include any type of logical connection between entities such as a data flow relationship, a parent-child relationship, logical-physical relationship, instance relationship, control flow relationship, etc. A data flow relationship may be identified where there is some type of relationship in the data and/or processing activity between entities. An illustrative example of a data flow relationship is the relationship between a file and a MapReduce™ job executed to process data of the file. A parent-child relationship refers to some type of hierarchical relationship between entities. An illustrative example of a parent-child relationship is the relationship between a file and a directory. A logical-physical relationship refers to any type of relationship between a logical entity and a physical entity. An illustrative example of a logical-physical relationship is the relationship between an Apache Hive™ query and a MapReduce™ job executed as part of the Apache Hive™ query execution at a particular host. An instance relationship refers to instance relationships between otherwise related entities. An illustrative example of an instance relationship is the relationship between a query template and a query execution instance. Another illustrative example of an instance relationship might be the relationship between a file and the multiple version instances (e.g., current and historical versions) of that file. A control flow relationship refers to a relationship between entities in which one entity exerts some level of control over another entity. For example, in the context of data flow, a source entity might control the flow of data to a target entity. An illustrative example of such a relationship might be the relationship between columns in an "insert" clause in an Apache Hive™ query (i.e., data source) and columns in a "where" clause of the same Apache Hive™ query (i.e., data target).

In some embodiments, at least some of the extracted metadata (indexed or not) may be stored in one or more data stores 410*a-n* comprising the repository 410. For example, the example embodiment depicted in FIG. 4B shows a lineage store 410*a*, a search store 410*b*, and one or more other data stores 410*n*. In this example, the one or more data stores may include metadata that can be accessed at step 480 by one or more services 455 associated with the metadata system 160, for example, to provide outputs at step 482 to clients 405 (e.g., via a user interface (UI) or an application programming interface (API)). As shown in FIG. 4B, a lineage service 455*a* may access metadata stored in a lineage store 410*a*, for example, to generate and output data lineage diagrams (i.e., visualizations) to clients 405. Similarly, a search service 455*b* may access metadata stored in a search store 410*b* to process queries from clients 405 and return query results containing relevant metadata at step 482. Other services 455*n* may include workflow analysis services, workflow recreation services, workflow optimizer services, etc.

Note that the architecture shown in FIG. 4B is an example provided for illustrative purposes and is not to be construed as limiting. For example, in some embodiments, the one or more services 455*a-n* may simply access a single data store containing all the stored metadata. Also, some embodiments may not include all of the services depicted in FIG. 4B such as lineage 455*a* and search 455*b*. Further, the multiple services 455*a-n* are depicted in FIG. 4B as separate from the metadata server 415 for illustrative clarity. However, this arrangement is not to be construed as limiting. The metadata services 455*a-n* may be separate from the metadata server 415 or may be part of the metadata server 415.

In some embodiments, the metadata stored at repository 410 may be further supplemented at step 484 with additional metadata gathered through a metadata enrichment process 440. Supplemental metadata added to the metadata extracted from the one or more services 435*a-n* may originate from user inputs received via clients 405, the metadata server 415, the extractors 465*a-n*, and/or the metadata services 455*a-n*. For example, extractors 465*a-n* with knowledge of the entities present in the computing cluster 135 may add tags indicative of entity associations and/or relationships to pieces of metadata extracted from the one or more services 435*a-n*. In other words, the data enrichment process 440 may include parsing the raw metadata (e.g., a machine generated log file), identifying express or implied entities and entity relationships in the parsed raw metadata and creating additional metadata extractions (e.g., the entities, entity relationships, etc.) on top of the raw metadata. As an illustrative example, metadata in the form of a query log extracted from Apache Hive™ may be enriched upon extraction (e.g., by one or more extractors 465*a-n*) with tags indicative of the entities associated with a particular Apache Hive™ query (e.g., tables, query templates, query executions) as well as the relationships between the entities (e.g., the instance relationship between a query template and a particular instance of a query execution resulting in the query log). Note that in some embodiments, the metadata enrichment process 440 may not actually alter the underlying raw metadata extracted from computing cluster 135 so as to avoid any loss in information. In such embodiments, the metadata abstractions added as part of the enrichment process may be stored along with or separately from the raw extracted metadata (e.g., in a separate data store).

Example Operating Environment with Cloud-Based Computing Clusters

In some embodiments, the distributed computing cluster 135 utilized to processes data may be deployed in a public or private cloud-based environment. Where deployed in a cloud-based environment, the multiple hosts 135*a-n* that form the nodes of the distributed computing cluster 135 may be implemented as virtual machines instead of physical machines. Specifically, a distributed computing cluster comprising a plurality of virtual host devices may be deployed in a cloud-computing platform managed by a third party such as Amazon™, Microsoft™, Google™, etc. Such a cloud-based computing cluster can be provisioned and destroyed as-needed to satisfy certain processing requirements. In this sense, such a cloud-based computing cluster is considered "ephemeral" or "transient."

Figure 5A:
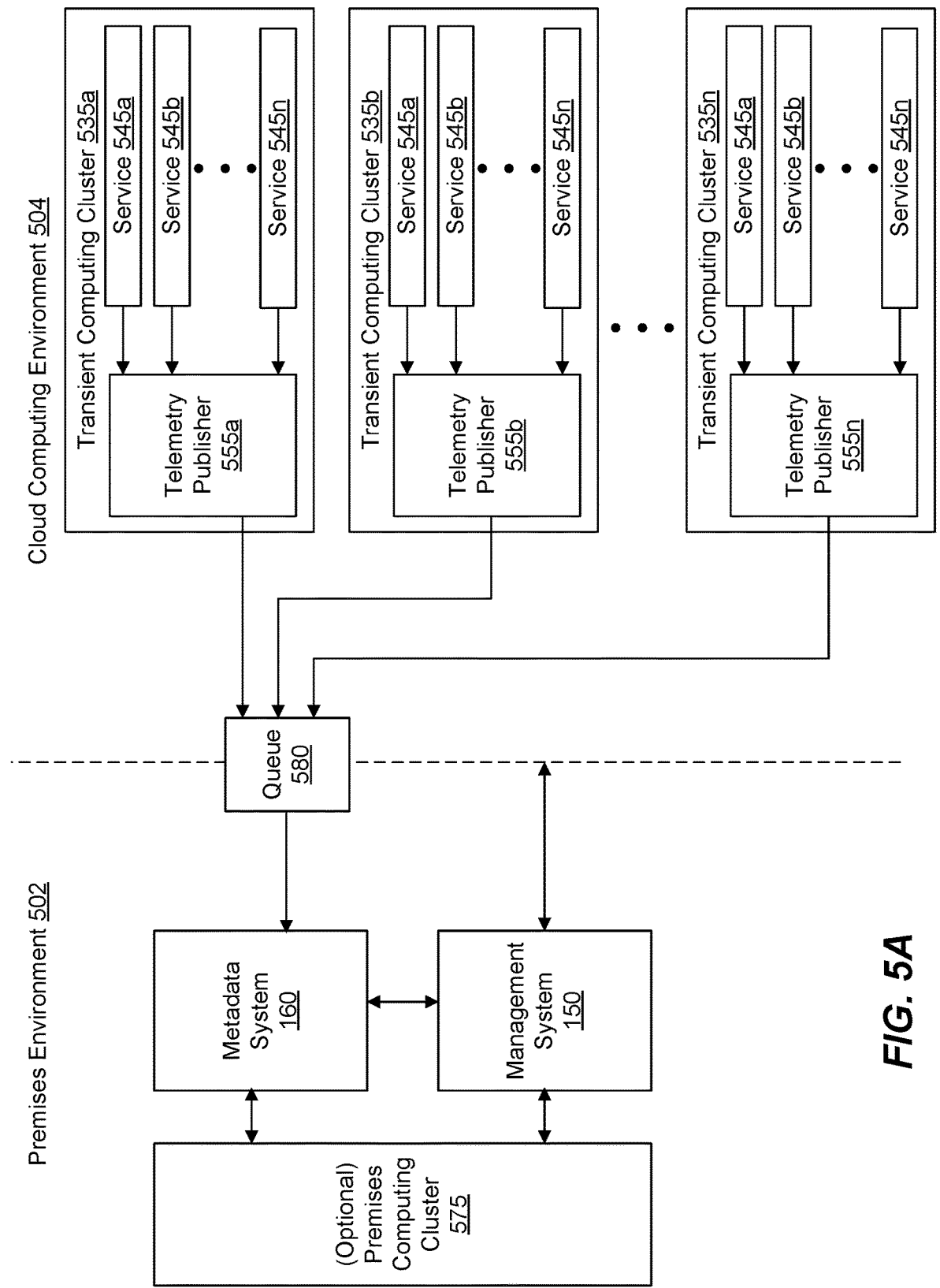
FIGS. 5A-5C are block diagrams that illustrate example operating environments that include transient computing clusters deployed in a cloud computing environment.
Figure 5B:
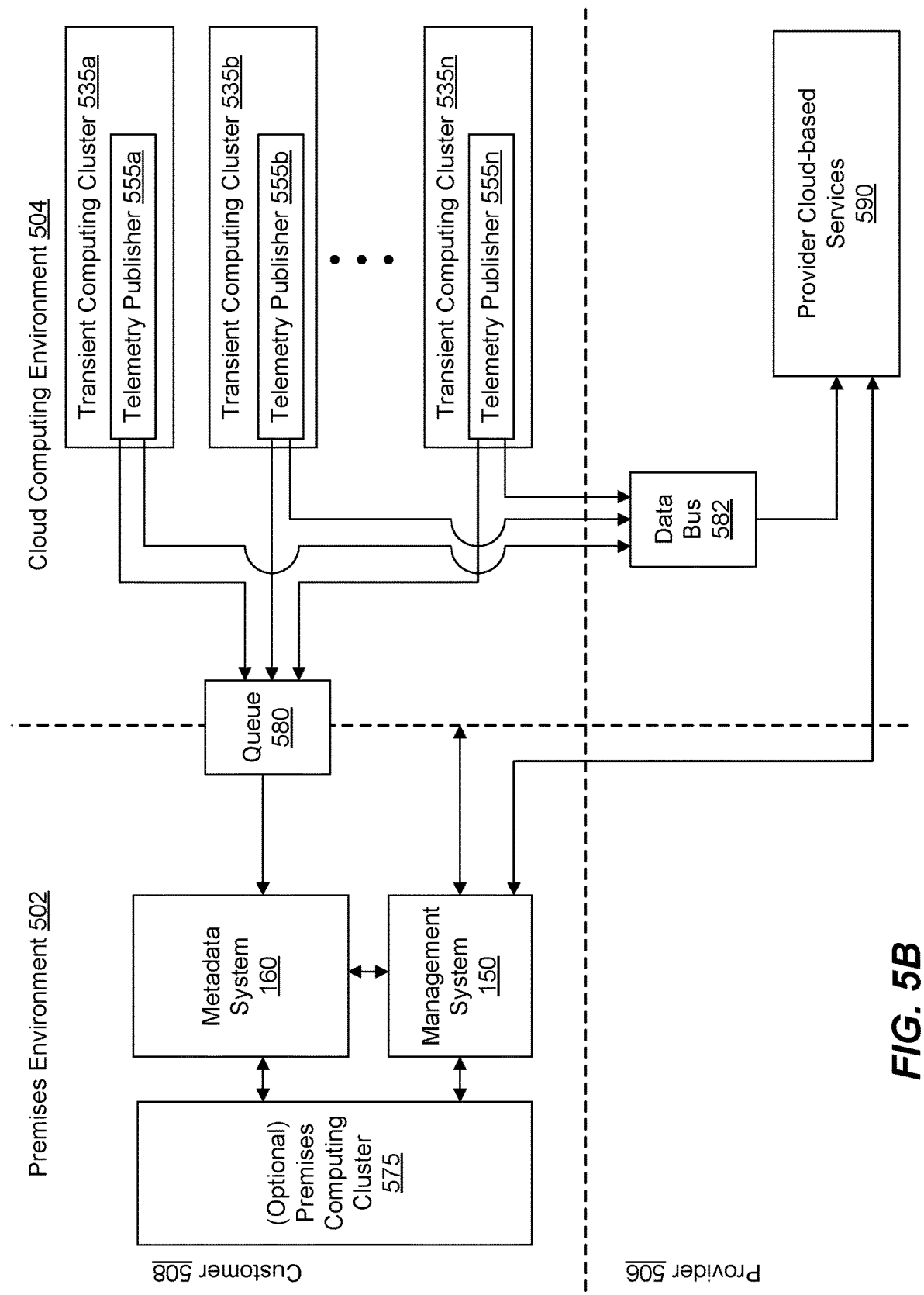
Figure 5C:
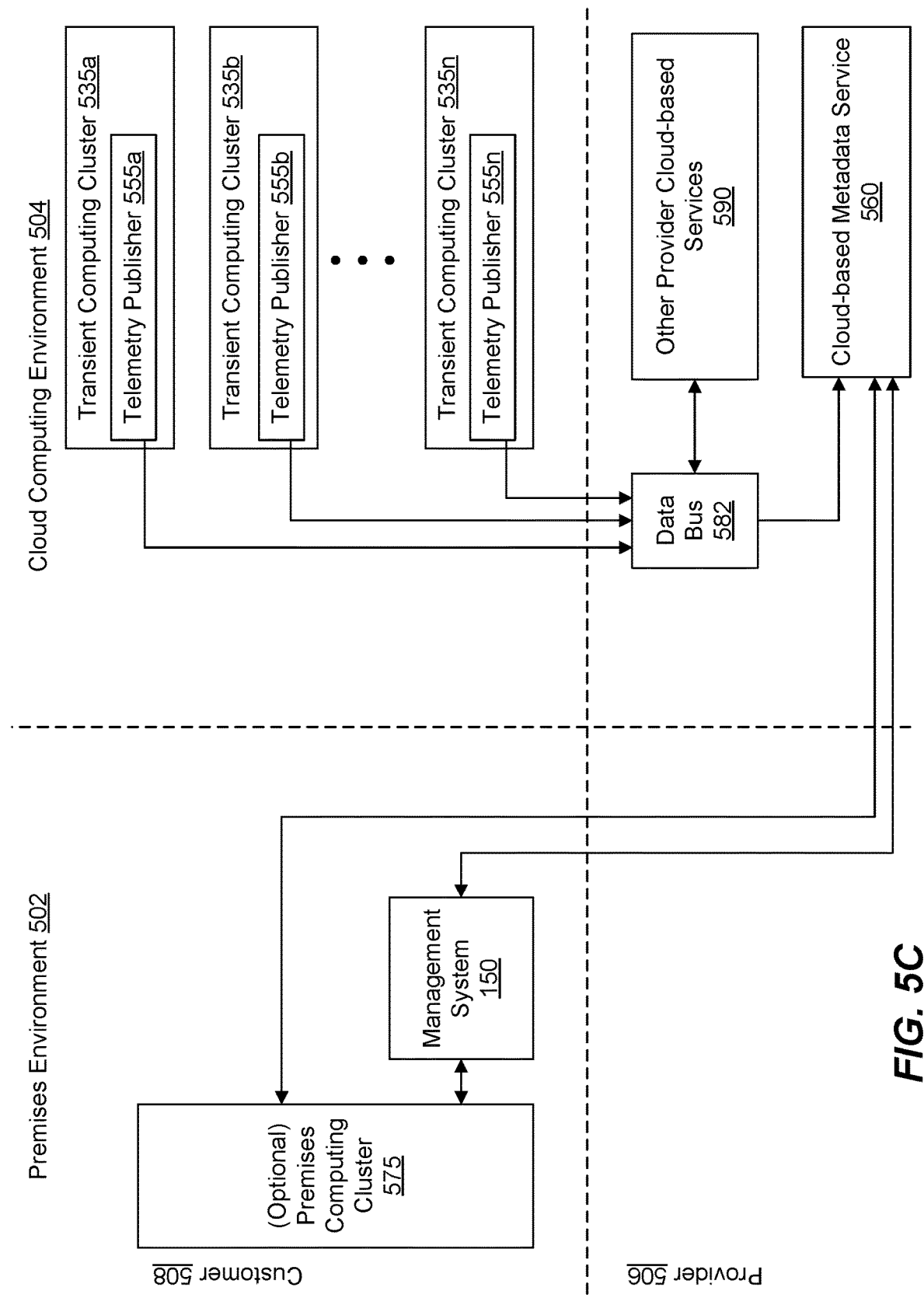

The transient nature of a cloud-based computing cluster presents a challenge from a metadata collection standpoint. In previously described examples, the nature of the computing cluster 135 is somewhat known to the metadata system 160. For example, as previously described, a cluster manager server 315 operating as part of a management system 150 may provide information associated with the cluster 135 to a requesting metadata server 415 of the metadata system 160. This information can then be utilized by the metadata system 160 to extract the necessary metadata from the one or more services 435a-n implemented in the cluster. This is not clearly possible in a cloud-based context where the computing clusters are transient. An example implementation may involve the provisioning and destruction of hundreds of transient computing clusters over the course of a single day. Each time a transient cluster is destroyed, all of the data including tables, results, records of the processing jobs, is typically lost. FIGS. 5A-5C show several example architectures for extracting metadata from services operating in one or more transient cloud-based computing clusters (e.g., for use by a metadata system 160) that address the challenges noted above.

FIG. 5A is a block diagram that illustrates a first example operating environment that involves one or more transient computing clusters deployed in a cloud computing environment. The operating environment depicted in FIG. 5A is separated into a premises environment 502 and a cloud computing environment 504 demarcated by the dotted line. The premises environment 502 includes the metadata system 160 (as described with respect to FIGS. 4A-4B), a management system 150 (as described with respect to FIG. 3), and an optional premises computing cluster 575. The premises computing cluster 575 in this context may include a plurality of hosts similar to the computing cluster 135 described with respect to FIGS. 1-4B. The plurality of hosts of the premises computing cluster 575 may represent a plurality of physical machines.

Conversely, the cloud computing environment 504 includes one or more transient computing clusters 535a-n. As previously mentioned, the cloud computing environment 504 may represent one or more public or private cloud computing environments operated and/or managed by one or more third-party cloud providers. For example, Amazon™ offers cloud computing services as part of the Amazon Web Services (AWS) platform. Other examples of cloud computing providers include Microsoft Azure™ and Google Cloud™. Functionality of certain described components residing in the cloud computing environment 504 may be implemented using products and services associated with a cloud computing platform such as AWS. In an illustrative embodiment, computing functionality is provided using virtual computing entities (e.g., Amazon™ EC2 virtual server instances and/or Lambda event-based computing instances) executing across one or more physical computing devices and storage functionality is provided using scalable cloud-based storage (e.g., Amazon™ S3 storage) and/or managed databases, data warehouses, etc. (e.g., Amazon™ Aurora, Amazonn™ DynamoDB, Amazon-™ Redshift, Google™ Spanner, etc.). In the architecture depicted in FIG. 5A, each transient computing cluster 535a-n may comprise a plurality of hosts similar to the computing cluster 135 of FIGS. 1-4B except that the hosts are implemented in software as virtual machines. For example, in the case of AWS, a transient computing cluster 535a-n may comprise an Amazon™ ECS cluster that includes a logical grouping of Amazon™ EC2 instances. Otherwise, each transient computing cluster 535a-n may be treated as a functional equivalent to the computing cluster 135 described with respect to FIGS. 1-4B for purposes of this document. Any reference functionality by or in relation to the computing cluster 135 may similarly apply to any one or more of the transient computing clusters 535a-n, and vice versa.

A user may provision one or more transient computing clusters 535a-n to process certain workloads, for example, through the management system 150. In some embodiments, transient computing clusters 535a-n may be provisioned to expand the user's computing resources beyond those available in a premises computing cluster 575. For example, a user may schedule, via the management system 150, the provisioning of transient cloud computing clusters 535a-n to handle workload during peak hours when demand may otherwise exceed the capabilities of any available premises computing cluster 575. Alternatively, a user may only utilize transient cloud computing clusters 535a-n as needed depending on workload requirements without maintaining a separate premises computing cluster 575. The specific manner in which the system is implemented will depend on user requirements.

Each of the transient computing clusters 535a-n can implement one or more services 545a-n (e.g., similar to the one or more services 435a-n described with respect to FIGS. 4A-4B) as well as a telemetry publisher component 555a-n. The telemetry publisher 555a-n at each of the transient computing clusters 535a-n operates as a metadata transport interface mechanism for enabling the transport of metadata generated by the one or more services 545a-n to the metadata system 160 for processing. More generally, the telemetry publisher 555a-n provides an interface for sending and receiving metadata in a consistent format by multiple metadata producers and multiple metadata consumers (respectively).

The telemetry publisher 555a-n at each of the transient computing clusters 535a-n may represent a software entity executing on one or more of the virtual machine hosts comprising any one of the transient computing clusters 535a-n. For example, in an Apache Hadoop™ deployment implementing HDFS, a single telemetry publisher entity may be deployed at a single node (e.g., the NameNode) at each of the one or more transient computing clusters 535a-n. In some embodiments, the telemetry publisher 555a-n is included in a virtual image such as an Amazon™ Machine Image (AMI) that defines the one or more virtual machine instances to be provisioned as part of a given transient computing cluster 535a-n. In other words, in response to a user command, for example, initiated via the management system 150, a virtual image (e.g., an AMI) that includes the telemetry publisher entity is utilized to provision and launch a transient computing cluster 535a-n in the cloud computing environment 504 (e.g., AWS). The specific configuration of each telemetry publisher 555a-n will depend on the cloud computing environment 504 in which it is deployed. For example, a telemetry publisher configured for operation in AWS may be configured differently than a telemetry publisher configured for operation in Microsoft Azure™ or Google Cloud™.

In some embodiments, the telemetry publisher 555a-n at each of the one or more transient computing clusters 535a-n is configured to extract or otherwise receive metadata from the one or more services 545a-n operating at the respective computing cluster, for example, similar to the way in which the one or more extractors 465a-n extract metadata from the one or more services 435a-n of the computing cluster 135 described with respect to FIG. 4B. Notably, as shown in FIG. 5B, each transient computing cluster provisioned in the cloud computing environment includes its own telemetry publisher instance. For example, a telemetry publisher 555*a* extracts metadata from services operating in transient computing cluster 535*a*, a telemetry publisher 555*b* extracts metadata from services operating in transient computing cluster 535*b*, etc.

Once extracted, the telemetry publisher 555*a-n* may process the metadata, for example, to add additional metadata in a data enrichment process similar to as described at step 484 in FIG. 4B. For example, telemetry publishers 555*a-n* with knowledge of the entities present in the transient computing clusters 535*a-n* may add tags indicative of entity identities, entity associations and/or relationships to pieces of metadata extracted from the one or more services 545*a-n* at each of the one or more transient computing clusters 535*a-n*. In other words, the data enrichment process may include parsing the raw extracted metadata (e.g., a machine generated log file), identifying express or implied entities and entity relationships in the parsed raw metadata and creating additional metadata extractions (e.g., the entities, entity relationships, etc.) on top of the raw metadata.

In some embodiments, the telemetry publishers 555*a-n* may process the extracted metadata (along with any supplemental metadata) to transform the metadata into a common format configured for consumption by the metadata system 160 and/or any other systems or services. For example, in some embodiments, metadata is processed and transformed into one or more data objects in a JavaScript Object Notation (JSON) format. The JSON objects generated by the telemetry publishers 555*a-n* may include tags indicating a particular transient computing cluster 535*a-n* from which they originate.

Extracted metadata (raw and/or processed) is then output by the one or more telemetry publishers 555*a-n* for delivery to one or more recipient entities such as the metadata system 160. In some embodiments, this may involve transmitting metadata to the recipient. Alternatively, or in addition, data output by the one or more telemetry publishers 555*a-n* can be placed into some type of cloud-based storage in the cloud computing environment 504 along with results of the processing of data by the transient computing clusters 535*a-n*. This cloud storage may operate as a staging area for delivery of data to the one or more recipient entities. In this way, data produced by a transient computing cluster 535*a-n* (including metadata and processing results) is retained even after the transient computing cluster 535*a-n* is destroyed after completing the requested processing. For example, in the case of AWS data can be placed into one or more Amazon™ S3 buckets. As another example, in the case of Microsoft Azure™, data can be placed into Azure Data Lake Store (ADLS). In any case, metadata can be published by the telemetry publishers 555*a-n* to a common queue 580 (i.e., using the cloud storage) that is read by recipient entities such as the metadata system 160. This common queue 580 can be set up when configuring the recipient entity (e.g., the metadata system 160 and provisioning the transient computing clusters 535*a-n*.

In some embodiments, the one or more telemetry publishers 555*a-n* can be configured to publish metadata to a provider side component in addition to the user side queue 580. FIG. 5B is a block diagram that illustrates a second example operating environment similar to that described with respect to FIG. 5A except that the environment is split into a provider 506 component and a user or customer 508 component demarcated by the horizontal dotted line. The user or customer 508 in this context may represent an enterprise or other organization utilizing various premises computing clusters 575 and/or cloud computing clusters 535*a-n* to process data, for example, for business intelligence. The provider 506, on the other hand, may represent an entity offering distributed computing (e.g., based on Apache Hadoop™) services to the user or customer 508. An example provider 506 may be Cloudera™. The provider 506 in this context may be different than the provider of the cloud computing services (e.g., Amazon™, Microsoft™, Google™, etc.). As indicated in FIG. 5B, the environment is split into four quadrants, a customer 508/premises 502 quadrant, a customer 508/cloud 504 quadrant, a provider 506/premises 502 quadrant, and a provider 506/cloud 504 quadrant.

As shown in FIG. 5B, in addition to publishing to queue 580 associated with the user/customer 508, the telemetry publishers 555*a-n* can be configured to publish to a provider 506 cloud-based component referred to as a data bus 582. The data bus 582 may represent a staging area or queue through which one or more provider cloud-based services 590 associated with the provider 506 receive metadata generated based on processing at the one or more transient computing clusters 535*a-n*. For example, the one or more provider cloud-based services 590 may include workload analytic services, workload analytic services, workload management services, etc.

Notably, in the example operating environment depicted in FIG. 5B, the metadata system 160 is arranged as part of the customer's 508/premises 502 infrastructure and so is configured to draw metadata from the queue 580 instead of the data bus 582. Alternatively, or in addition, the metadata system 160 may be implemented at least in part as a cloud-based system, for example, as depicted in the block diagram of FIG. 5C. FIG. 5C is a block diagram that illustrates a third example operating environment similar to that described with respect to FIG. 5B except that the metadata system is implemented by the provider 506 as a cloud-based metadata service 560. The cloud-based metadata service 560 may otherwise operate to process metadata similar to the metadata system 160 described with respect to FIGS. 4A-5B except that it may be configured to extract or otherwise receive metadata from the cloud-based data bus 582.

The diagrams provided in FIGS. 5A-5C are simplified for illustrative purposes to show how various components of several example operating environments may interact. The diagrams are not intended to be limiting. For example, other embodiments may include more or fewer components and may be arranged differently than as depicted in FIGS. 5A-5C. Further, the certain segmentations of the example environments may be simplified for clarity. For example, diagrams of FIGS. 5B-5C are not intended to suggest that provider 506 and customer 508 cloud components need operate in the same cloud-computing environment 504 or that provider 506 and customer 508 premises components operate at the same premises location.

Figure 6:
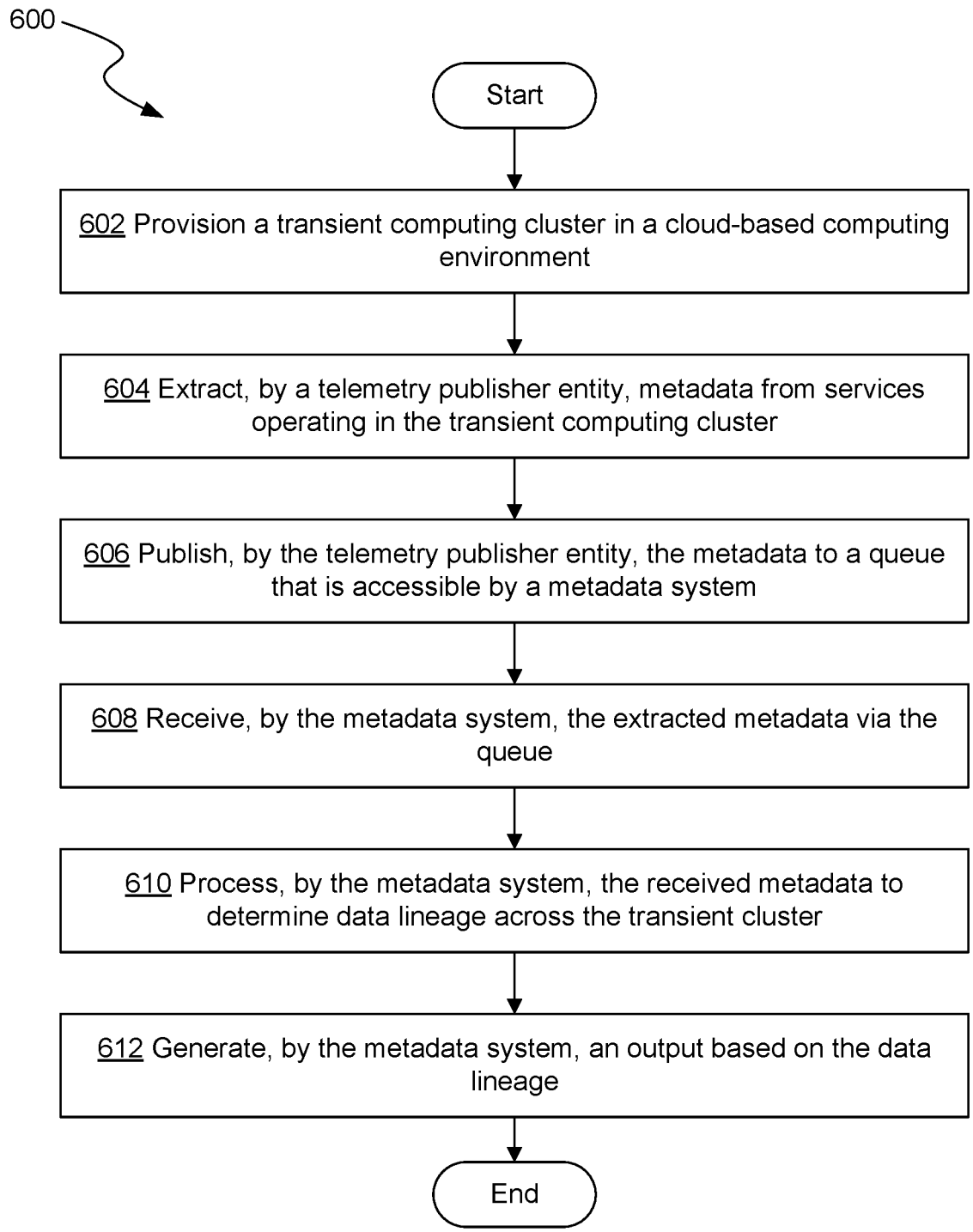
FIG. 6 is a flow chart that describes an example process for extracting and processing metadata from a transient computing cluster in a cloud-based environment.

FIG. 6 shows a flow chart describing an example process 600 for extracting and processing metadata from a transient computing cluster in a cloud-based environment. The example process 600 is described with respect to the example system architecture depicted in FIG. 5A. A person having ordinary skill will recognize that the architecture of the system may differ in other embodiments. One or more steps of the example process 600 may be performed by any one or more of the components of the example processing system 1600 described with respect to FIG. 16. For example, the example process 600 depicted in FIG. 6 may be represented in instructions stored in one or more memory units that are then executed by one or more processing units. The process 600 described with respect to FIG. 6 is an example provided for illustrative purposes and is not to be construed as limiting. Other processes may include more or fewer steps or may perform steps in a different order than depicted in FIG. 6 while remaining within the scope of the present disclosure.

The example process 600 begins at step 602 with provisioning a transient computing cluster 535*a-n* in a cloud-based computing environment 504 (e.g., AWS, Microsoft Azure™, Google Cloud™, etc.). In some embodiments, this step of provisioning the transient computing cluster 535*a-n* involves generating a virtual image (e.g., an AMI) that defines the one or more services 545*a-n* to implement in the transient computing cluster and a telemetry publisher 555*a-n* that is configured to extract metadata from the plurality of services 545*a-n* and publish the extracted metadata to a queue 580 (e.g., associated with Amazon™ S3 or ADLS). Step 602 may further include uploading the generated virtual image to the cloud-based computing environment 504 to pre-populate a plurality of virtual machine instances that operate as nodes of the transient computing cluster 535*a-n*.

In some embodiments, the transient computing cluster 535*a-n* is provisioned automatically in response to one or more events. For example, the transient computing cluster 535*a-n* may be previsioned in response to receiving a query, in response to determining that a premises computing cluster 575 does not include sufficient resources to process a job, in response to a scheduled event, or in response to any other type of event. In some embodiments, the transient computing cluster 535*a-n* may be provisioned in response to a user request. In any case, the provisioning of transient computing clusters 535*a-n* may be controlled by the management system 150.

The example process 600 continues at step 604 with the telemetry publisher entity 555*a-n* extracting metadata from the one or more services operating in the transient computing cluster 535*a-n*. As previously discussed, the telemetry publisher 555*a-n* is configured with knowledge of the one or more services 545*a-n* operating in the transient computer cluster 535*a-n*. In some embodiments, the process of extracting the metadata (including run-time artifacts) from the one or more services 545*a-n* is similar to the process performed by the extractors 465*a-n* described with respect to FIG. 4B.

The example process 600 continues at step 606 with the telemetry publisher publishing the extracted metadata to a queue 580 that is accessible to the metadata system 160. The step of publishing the metadata to the queue 580 may include pushing the metadata to some type of persistent storage that is accessible to the metadata system 160. This persistent storage may be premises storage or may be cloud-based (e.g., Amazon™ S3 buckets, Microsoft™ ADLS, etc.).

Although not depicted in the flow chart of FIG. 6, in some embodiments, process 600 may include the telemetry publisher 555*a-n* first converting the extracted metadata into a common format that is readable by the metadata system 160 before publishing the metadata to the queue 580. As part of this process of conversion, the telemetry publisher 555*a-n* may generate a data object (e.g., a JSON object) that includes the extracted metadata. Publication of the extracted metadata may therefore involve saving the generated data object to the persistent storage (e.g., the premises or cloud-based data store).

In some embodiments, process 600 may further include the telemetry publisher 555*a-n* appending a tag (or some other type of indicator) to the extracted metadata before publishing the metadata to the queue 580. The tag may, for example, include information indicative of a source of the metadata being published. Source in this context may include, for example, the source data that was processed to generate the metadata, an entity (e.g., directory, a table, a script, a script execution, a query template, a query execution, a job template, a job execution, etc.) associated with the processing, a service 545*a-n* that generated the metadata, and/or a transient computer cluster 535*a-n* within which the metadata was generated. For example, a piece of metadata generated by a particular service 545*a-n* (e.g., Apache Hive™) may be processed by the telemetry publisher 555*a-n* to produce a data object (e.g., a JSON object) that includes the piece of metadata along with one or more tags that indicate that the piece of metadata was generated by the particular service 545*a-n* at a particular node in a particular transient computing cluster 535*a-n*.

Returning to FIG. 6, example process 600 continues at step 608 with the metadata system 160 receiving the extracted metadata published by the telemetry publisher 555*a-n* via the queue 580. In some embodiments, the metadata system 160 indexes and stores the metadata received at step 608, for example, as described with respect to step 478 in FIG. 4B. In other words, the received metadata may be stored in one or more repositories 410 of the metadata 160 for later processing.

Example process 600 continues at step 610 with processing the received metadata to determine a data lineage across the transient computer cluster 555*a-n*. The process of determining data lineage may be performed, for example, by or in conjunction with a lineage metadata service 455*a* described with respect to FIG. 4B. In some embodiments, the process of determining data lineage involves processing the metadata to identify entities associated with the processing of the data and relationships between the entities and/or inferring design-time information based on the run-time artifacts included in the metadata, for example, as described in the example process 700 shown at FIG. 7. The step of determining data lineage can, in some embodiments, include determining data lineage across multiple transient computing clusters 535*a-n*. For example, as will be described later, certain workflows may include data overlap and/or dependencies. Accordingly a data lineage from a set of source data, through one or more intermediate processing steps, to a final result, may span activity across multiple transient computing clusters 535*a-n* (invoked in parallel and/or sequentially). A specific example may involve processing of source data in a first transient computing cluster to generate a table that is then used for processing in a second transient computing cluster to produce a result.

Example process 600 continues at step 612 with generating an output based on the data lineage determined at step 610. As will be described in more detail later, this generated output may include information regarding the data lineage that is presented to the user, for example, in the form of a lineage diagram. The output may also include events and/or other automated actions generated in response to the determined data lineage. For example, as will be described, a metadata system 160 may automatically perform optimization of certain workflows performed in one or more of the transient computing clusters based on identified dependencies and/or redundancies included in the workflows.

Inferring Design-Time Information Based on Run-Time Artifacts

Figure 7:
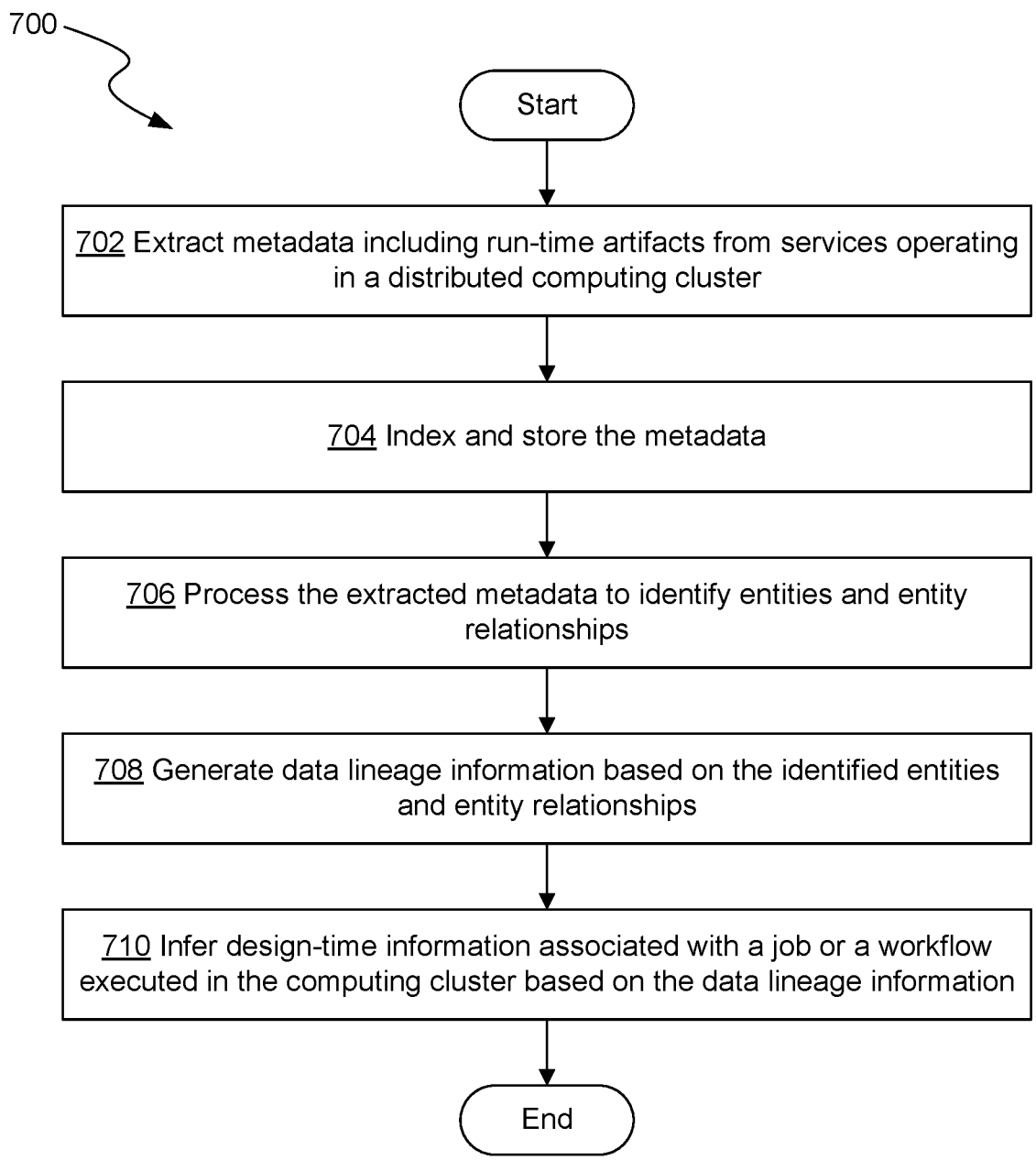
FIG. 7 is a flow chart that describes an example process for inferring design-time information based on run-time artifacts.

FIG. 7 shows a flow chart describing an example process 700 for inferring design-time information based on run-time artifacts. The example process 700 is described with respect to the example system architecture depicted in FIG. 4B. A person having ordinary skill will recognize that the architecture of the system may differ in other embodiments. For example, the technique for inferring design time information based on run-time artifacts can similarly be implemented using any of the system architectures depicted in FIGS. 5A-5C. One or more steps of the example process 700 may be performed by any one or more of the components of the example processing system 1600 described with respect to FIG. 16. For example, the example process 700 depicted in FIG. 7 may be represented in instructions stored in one or more memory units that are then executed by one or more processing units. The process 700 described with respect to FIG. 7 is an example provided for illustrative purposes and is not to be construed as limiting. Other processes may include more or fewer steps or may perform steps in a different order than depicted in FIG. 7 while remaining within the scope of the present disclosure.

The example process 700 begins at step 702 with receiving metadata from one or more services 435*a-n* operating in a distributed computing cluster 135. As previously discussed, the metadata may be received as part of a metadata extraction process involving one or more extractor entities 465*a-n* associated with a metadata system 160. The extracted metadata may include operation metadata in the form of or based on run-time artifacts generated by the one or more services 435*a-n* as the one or more services 435*a-n* process (i.e., execute) a job or a workflow involving a sequence of multiple jobs on data stored in the computing cluster. As previously mentioned, a "run-time artifact" refers to any type of data generated by entities (e.g., services 435*a-n*) during the processing of data in the distributed computing cluster 135 (i.e., at run-time). Some illustrative examples of run-time artifacts may include operational logs, table metadata, query metadata, job execution metadata, script execution metadata, etc.

The example process 700 continues at step 704 with indexing and storing the extracted metadata in a repository 410 as described with respect to FIG. 4B. As further described with respect to FIG. 4B, the step of indexing and storing the metadata may include or be associated with, at step 706, processing the extracted metadata to identify entities (e.g., files, directories, tables, scripts, script executions, query executions, query templates, job templates, job executions, etc.) involved in the run-time processing of data (i.e., execution of jobs and workflows) in the distributed computing cluster 135 and identifying entity relationships (e.g., data flow, parent-child, logical-physical, instance of, control flow, etc.). In some embodiments, extracted metadata indexed according to identified entities and entity relationships can be stored in two separate data stores (collectively part of repository 410). A first data store may include information associated with nodes in a graph representing identified entities while a second data store may include information associated with edges in the graph representing identified relationships between identified entities.

The identification of entities (and their associated properties) may be based on express identifiers occurring in the metadata and/or implied based on any other information included in the metadata. For example, an identifier associated with a particular table may show up in the run-time metadata generated by any one or more of the services 435*a-n* performing operations on the particular table. As another example, a job template entity may be inferred based on job parameters showing up in the run-time metadata generated by one or more of the services 435*a-n* executing the job. Similarly the identification of entity relationships may be based on express identifiers included in the metadata or may be implied based on information included in the metadata. For example, directory metadata received from a data storage system (e.g., Apache™ HDFS) associated with the computing cluster 135 may expressly call out parent-child file relationships. As another example, a data flow relationship between entities may be implied, for example, based on temporal proximity. Consider, for example, a first job execution with properties A (executed at time t1), a second job execution with properties B (executed at time t1), and a third job execution with properties C (executed at time t1). Without further information, the three jobs may appear unrelated; however, upon analyzing the entity properties of the three jobs, some type of entity relationship may be implied. For example, the three jobs may represent multiple instances of the same job (as evidenced by corresponding properties). Alternatively, the three jobs may have a data flow or control flow relationship in which the jobs are performed in sequence according to a workflow.

In some embodiments, additional information is added to the identified entities and entity relationships at the metadata ingestion stage, for example, to facilitate lineage generation (see step 708). For example, information associated with a particular entity may be added as labels (or some other type of data) to a node corresponding to the particular entity that is stored in repository 410. In an example embodiment, identified entities are assigned entity levels based on their entity type. For example, top level parent entities may be assigned as a first or default entity type, child entities that have a parent may be assigned as a second entity type, and entities that involve a "mini lineage" such as scripts and workflows may be assigned as a third entity type. Again, the manner in which entities are classified will depend on the requirements of a given implementation. In some embodiments, information regarding entity relationships can be added to identified entities. For example, if an entity is a template and has an instance relationship with one or more other entities representing instances of the template, information associated with the instance children (e.g., entity identifiers) may be added to the template entity and vice versa. As another example, if an entity has a data flow relationship to one or more other entities, information indicative of the data flow may be added to the entities. For example, information indicating that a downstream entity exists (e.g., a target entity identifier) may be added to source entities, while information indicating that an upstream entity exists (e.g., a source entity identifier) may be added to target entities. Again, the manner in which entity relationships are indicated for identified entities will depend on the requirements of a given implementation.

The example process 700 continues at step 708 with generating data lineage information based on at least some of the identified entities (and associated entity properties) and the identified relationships between entities. Data lineage generally refers to a representation of the path of data through a data processing system. More specifically, data lineage can refer to the path of data through a plurality of entities associated with the data processing system. Data lineage may describe, for example, the source of data, the type of data, operations performed on the data, movements of the data, etc. Consider again the architecture described with respect to FIG. 4B. In response to a lineage request, a process may traverse the graph (stored in repository 410), including the multiple nodes and edges linking the nodes to generate lineage information associated with one or more entities. In some embodiments, this lineage information may be utilized to generate and display data lineage diagrams via a UI of a client 405. FIGS. 16A-16D show some example data lineage diagrams that help to illustrate the concept of data lineage. Notably, this process of generating data lineage information by traversing the graph can be performed without editing, transforming, or otherwise altering the underlying raw and/or indexed metadata.

The logic applied to traverse the graph to generate lineage information can depend on one or more predefined rules. In an illustrative embodiment, a lineage process begins with creating and identifying a set of one or more "seed entities" from the set of entity nodes in a stored graph in the metadata system 160. The "seed entities" in this context may be any of the identified entities and are based on the specifics of the lineage request. As an illustrative example, a lineage request configured to track data lineage stemming from a submitted query may include an identifier associated with the query execution entity. Based on the identifier included in the lineage request, certain related entities (e.g., related instances, parents, etc.) may be retrieved as seed entities. Again, the particular entities retrieved as seed entities may depend on the type entities identified in the lineage request and/or the rules established for the given system implementation.

Beginning with the retrieved seed entities, a lineage process may continue with retrieving one or more entity relationships associated with the seed entities. As previously mentioned, in some cases, the entity relationships are stored in repository 410 as edges of a graph. In some embodiments, the lineage process is specifically configured to retrieve flow relationships (e.g., data flow and/or control flow) to and from entities such as directories and/or retrieve all child or partial entity relationships. These steps for retrieving entity relationships can be performed both upstream and downstream from the seed entities.

In some embodiments, certain rules may be applied to clean up or streamline the generated lineage information, such as avoiding traversing entities that do not directly participate in a particular lineage, avoiding traversing files for tables (unless the lineage is based on a file entity), specifically following relationships from templates for specific services such as Apache Hive™ or Apache Impala™, discarding redundant relationships between common entities, etc. For example, two entities may exhibit multiple entity relationships based on the extracted metadata. In some embodiments, generated lineage information may retain all of these entity relationships. In other embodiments, redundant entity relationships may be discarded based on defined priority level of the relationships (e.g., data flow>control flow>logical/physical, etc.).

The example process 700 continues at step 710 with inferring design-time information based on the extracted metadata. In some embodiments, the inferred design-time information may be based at least in part on lineage information generated based on the extracted metadata.

Recall that "design-time information" in this context refers to any information regarding the design of a system in general (e.g., computing devices, services, file systems, etc.) configured to store and process the data, the design of applications of the system (e.g., jobs, workflows, projects, etc.) to process data, and/or any other design-time information. For example, design-time information may include information on tables (and associated columns) utilized to structure the data (e.g., schema), information on jobs (e.g., job resource objects) utilized to execute jobs on the data, information on workflows (e.g., job sequences, workflow definition objects, etc.) utilized to perform sequences of jobs, information on projects or applications that make use of the data processing, information on services utilized to process data, information on resources (e.g., physical devices, software, etc.) utilized to process data, etc. In some embodiments, design-time information may include design-time artifacts that are generated and/or utilized by system components to process data. For example, project build automation tools such as Apache Maven™ generate artifacts at design-time that are used by the project to process data. In the specific context of Apache Maven™ projects, design-time artifacts may include source and binary code distributions, Java™ archives (JARs), web application resource archives (WARs), and/or other types of files or archives of files.

A metadata system 160 implemented, for example, as shown in FIG. 4B, may leverage domain knowledge as well as specific information regarding the architecture of the computing cluster 135 in order to infer design-time information based on extracted run-time metadata and/or data lineage information based on the extracted run-time metadata. For example, the metadata system 160 may be configured to analyze metadata in a specific domain context (e.g., Apache Hadoop™) and/or may gain insight into the architecture of the computing cluster through communicating with the cluster manager server 315, for example, as previously described with respect to FIG. 4B.

Recreating Design-Time Elements

Figure 8:
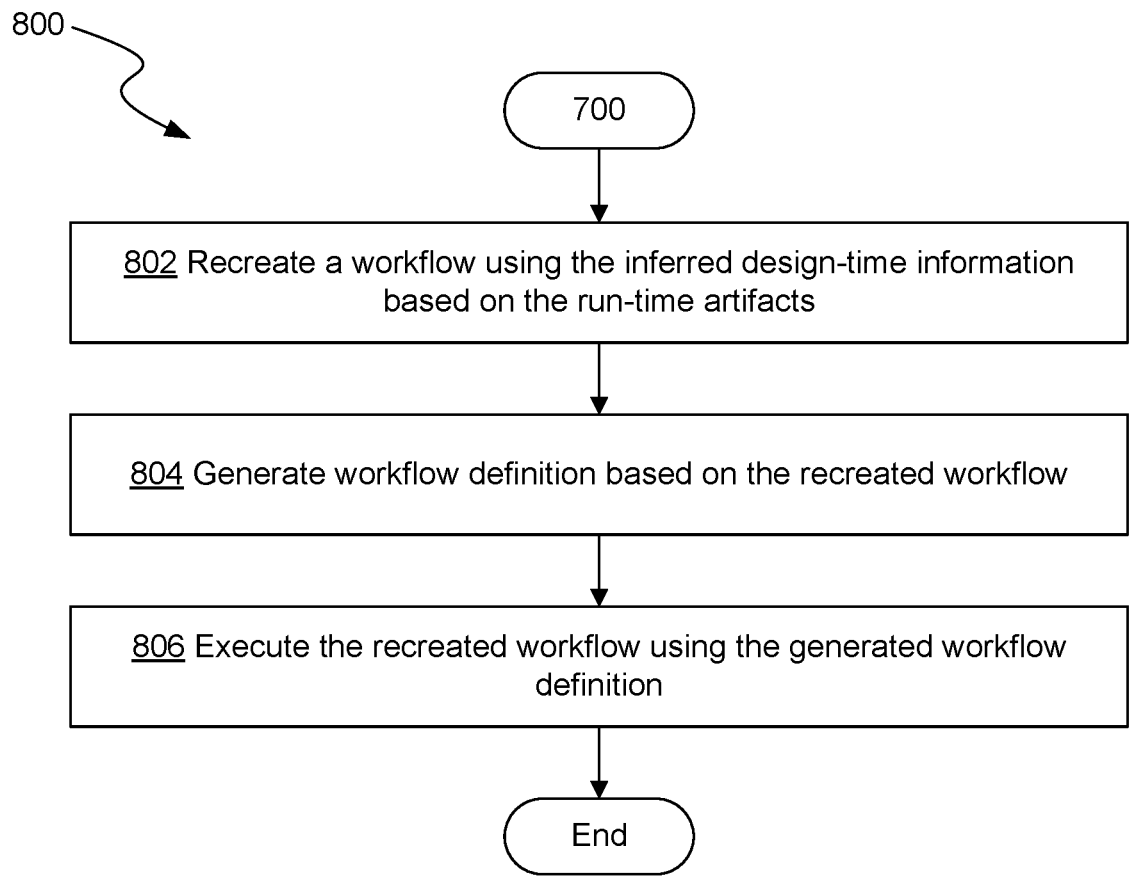
FIG. 8 is a flow chart that describes an example process for recreating a workflow based on extracted run-time metadata.

In some embodiments, a metadata system 160 may be configured to recreate design-time elements (e.g., workflows) based on the inferred design-time information. FIG. 8 shows a flow chart describing an example process 800 for recreating a design-time element such as a workflow based on the extracted run-time metadata. The example process 800 is described with respect to the example system architecture depicted in FIG. 4B. A person having ordinary skill will recognize that the architecture of the system may differ in other embodiments. For example, the technique for recreating design time elements can similarly be implemented using any of the system architectures depicted in FIGS. 5A-5C. One or more steps of the example process 800 may be performed by any one or more of the components of the example processing system 1600 described with respect to FIG. 16. For example, the example process 800 depicted in FIG. 8 may be represented in instructions stored in memory that are then executed by a processing unit. The process 800 described with respect to FIG. 8 is an example provided for illustrative purposes and is not to be construed as limiting. Other processes may include more or fewer steps or may perform steps in a different order than depicted in FIG. 8 while remaining within the scope of the present disclosure. Note that the example process 800 is described in the context of recreating workflows but may similarly be applied to recreating other types of design-time elements.

As indicated in FIG. 8, the example process may continue from the example process 700 of FIG. 7. The example process 800 begins at step 802 with recreating a workflow based on the inferred design-time information. The workflow is recreated in that it is generated after having been run based at least in part on metadata generated when running the workflow. In other words, recreating a workflow includes determining a structure or design of the workflow based on the inferred design-time information. The structure or design of the workflow may include identification of the data processed according to the work, data processing jobs included in the workflow, sequencing and/or scheduling of the data processing jobs, the output generated by the workflow, etc. A workflow in this context may be a heterogeneous workflow representing a sequence of jobs performed using various types of services in computing cluster 135. For example, a recreated workflow in Apache Hadoop™ may include a sequence of multiple MapReduce™ jobs, Apache Hive™ jobs, Apache Impala™ jobs, etc.

Figure 9:
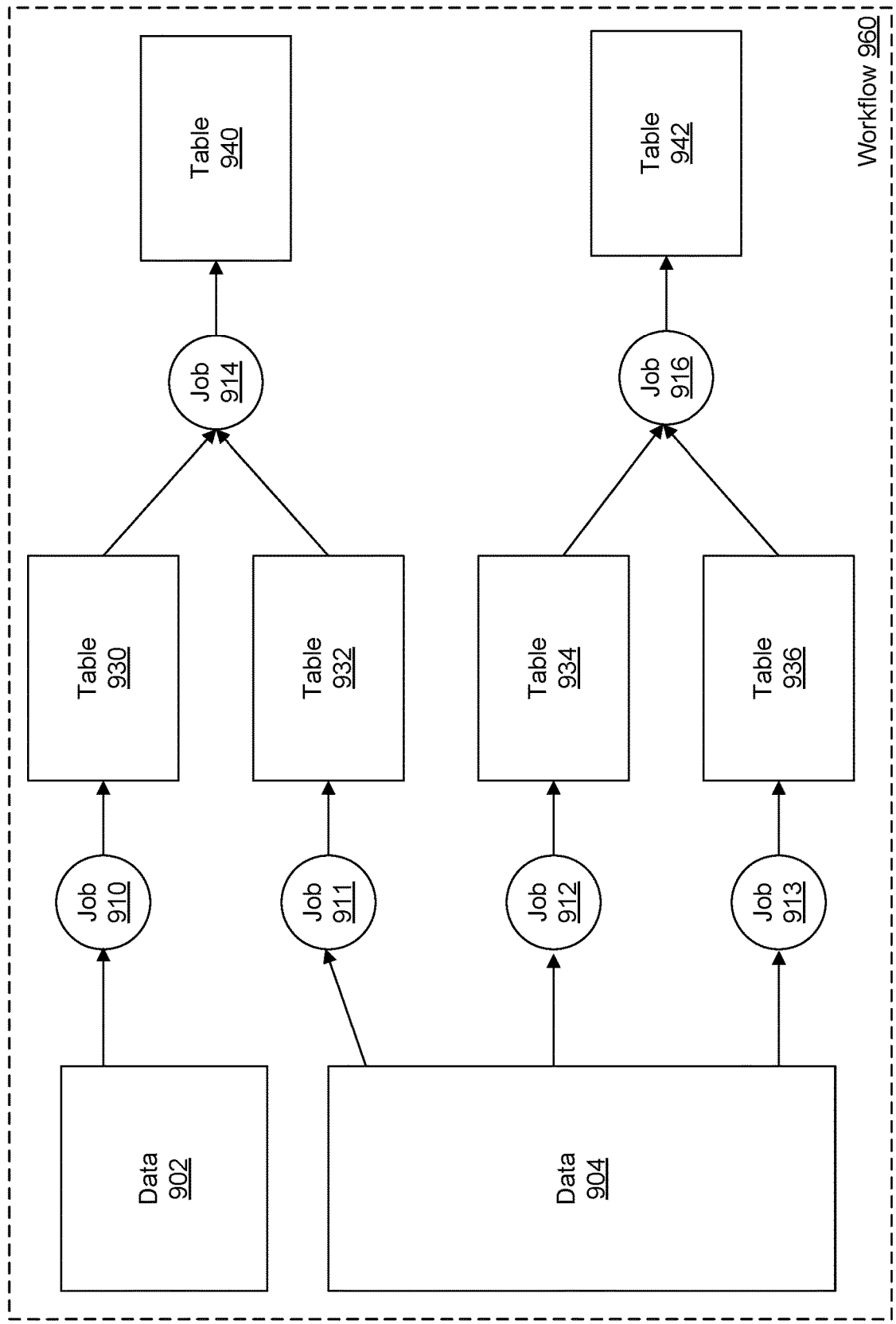
FIG. 9 is a diagram illustrating an example workflow including multiple jobs.

Consider, for example, the scenario depicted in FIG. 9. FIG. 9 shows an example workflow 960 applied to process data from two data sources 902 and 904 to produce two tables 940 and 942. The two tables 940, 942 may represent reports that are produced periodically (e.g., every day) by an enterprise business department. In the illustrative example, the two tables 940, 942 are generated by performing multiple jobs (in some cases queries) on the data from sources 902, 904. Specifically, in this example, a job 910 is executed using source data 902 to produce a temporary intermediate table 930 and jobs 911, 912, and 913 are executed using source data 904 to produce temporary intermediate tables 932, 934, and 936. A job 914 is then executed using temporary intermediate tables 930 and 932 to produce the first table 940 and a job 916 is executed using temporary intermediate tables 934 and 936.

As previously mentioned, the workflow 960 may be heterogeneous, meaning that the multiple jobs 910-914 and 916 involved in the workflow 960 may have been performed by multiple different services such as MapReduce™, Apache Hive™, Apache Impala™, etc. Each of these services may have kept a record (e.g., a log) of jobs performed and the parameters of such jobs; however, the structure of the workflow would otherwise be lost after processing. In other words, without the techniques described herein, the record of the workflow would appear to be a set of jobs 910-916 performed but with no information on how the jobs related to each other. Instead, by utilizing the run-time metadata generated during execution of the jobs (as previously described) design-time information can be inferred and design-time elements recreated. For example, the workflow 960 can be recreated by metadata generated by the one or more services (e.g., MapReduce™, Apache Hive™, Apache Impalam™, etc.) executing the jobs 910-916. In an embodiment, certain design-time information (e.g., relationships, dependencies, sequencing, etc. between the jobs 910-916) can be inferred, for example, by generating and analyzing lineage information associated with the data (as previously described). In some embodiments, inferring the design-time information, for example, to recreate a workflow such as workflow 960 may involve analyzing multiple data lineages, if necessary.

Returning to FIG. 8, in some embodiments, example process 800 may continue with generating information based on the recreated workflow, for example, to enable execution of the recreated workflow again in the computing cluster 135. For example, in some embodiments, example process 800 may involve generating at step 804 a workflow definition based on the recreated workflow. For example, the workflow definition may be in the form of a configuration element such as an Extensible Markup Language (XML) file that can be utilized by a workflow engine (e.g., Apache Oozie™) to, at step 806, execute the workflow in the computing cluster 135.

Versioning Design-Time Elements

In some embodiments, a metadata system 160 may be configured to infer previous versions of design-time elements at various points in time based on run-time metadata. As previously mentioned, in a data processing system implementing a bottom up "schema on read" approach (e.g., using Apache Hadoop™), work on the data may be often be ad hoc and exploratory in nature. In other words, since the schema are not predefined, users may run several workflow iterations to process their data before arriving at a set of desired results. The multiple iterations of various design-time elements such as individual jobs or workflows can therefore be inferred and recreated, for example, by applying previously described processes.

In some embodiments, versioning of design-time elements such as jobs, workflows, tables, files, etc. may include inferring some logical connection between the elements. Consider again the previously described scenario involving a first job execution with properties A (executed at time t1), a second job execution with properties B (executed at time t1), and a third job execution with properties C (executed at time t1). Without further information, the three jobs may appear unrelated; however, analyzing the entity properties of the three jobs may reveal that the three jobs represent three different versions of the "same" job at different points in time. Accordingly, with this inference, the metadata system 160 can effectively look back in time at a previous version of a design-time element such as a job, workflow, table, file, etc. In some embodiments, a previous version of a static element such as a table may be inferred by analyzing related dynamic elements such as operations. For example, a previous version of a table may be inferred by analyzing a current version of the table and one or more operations that were run to arrive at the current version of the table. Accordingly, with information regarding various operations performed at various points in time on various tables, the metadata system 160 may recreate various versions of the "same" table. This process may similarly be applied to recreate previous versions of a workflow comprising multiple jobs such as the example workflow 960 described with respect to FIG. 9.

Figure 10:
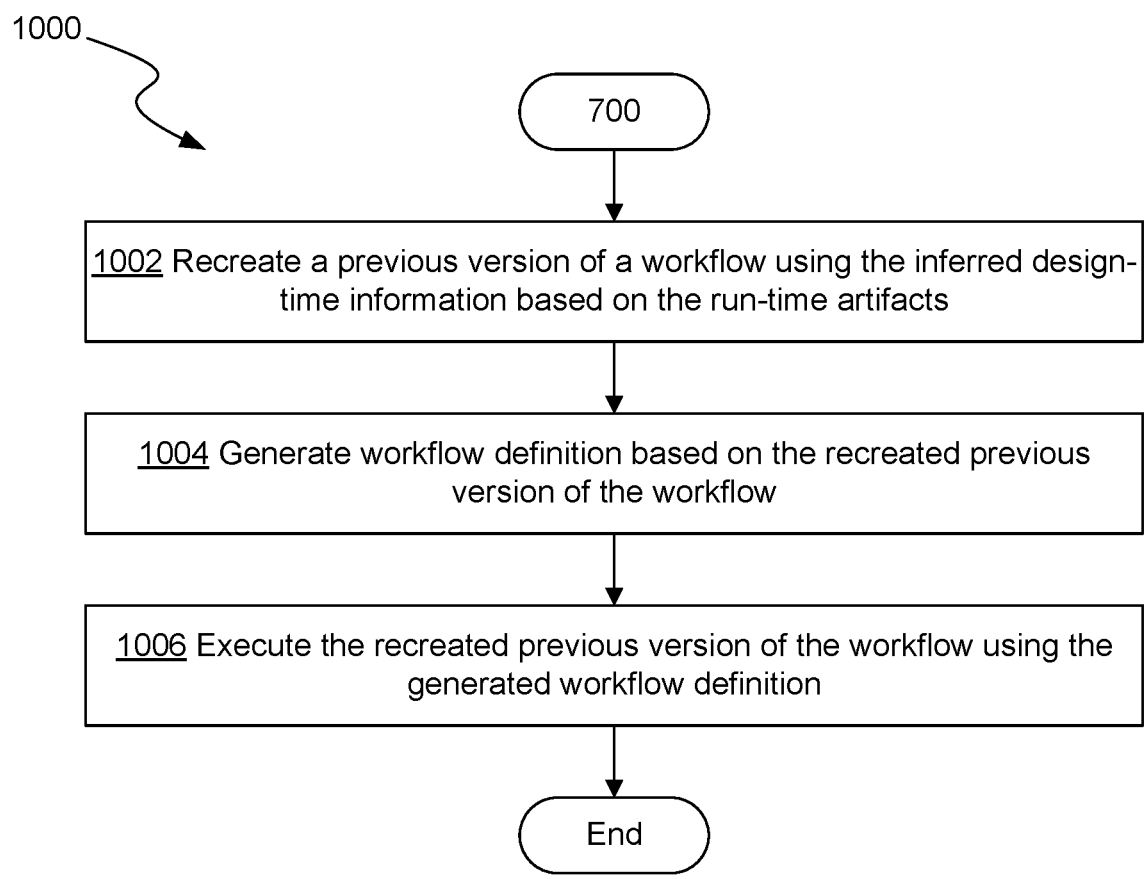
FIG. 10 is a flow chart that describes an example process for recreating a previous version of a workflow based on extracted run-time metadata.

FIG. 10 shows a flow chart describing an example process 1000 for recreating previous versions of a design-time element such as a workflow based on the extracted run-time metadata. The example process is 1000 is described with respect to the example system architecture depicted in FIG. 4B. A person having ordinary skill will recognize that the architecture of the system may differ in other embodiments. For example, the technique for versioning design-time elements can similarly be implemented using any of the system architectures depicted in FIGS. 5A-5C. As with the example process 800, one or more steps of the example process 1000 may be performed by any one or more of the components of the example processing system 1600 described with respect to FIG. 16. For example, the example process 1000 depicted in FIG. 10 may be represented in instructions stored in memory that are then executed by a processing unit. The process 1000 described with respect to FIG. 10 is an example provided for illustrative purposes and is not to be construed as limiting. Other processes may include more or fewer steps or may perform steps in a different order than depicted in FIG. 10 while remaining within the scope of the present disclosure. Note that the example process 1000 is described in the context of recreating previous versions of workflows but may similarly be applied to recreating previous versions of other types of design-time elements. As indicated in FIG. 10, the example process may continue from the example process 700 of FIG. 7.

The example process 1000 begins at step 1002 with recreating a previous version of a workflow using inferred design-time information based at least in part on run-time artifacts. The example process continues at step 1004 with generating a workflow definition of the recreated previous version of the workflow, for example, similar to as described with respect to step 804 in example process 800. The example process 1000 continues at step 1006 with executing the recreated previous version of the workflow using the workflow definition generated at step 1004, for example, similar to as described with respect to step 806 in example process 800.

Optimizing Design-Time Elements Based on Inferred Design-Time Information

In some embodiments, a metadata system 160 may be configured to optimize certain design-time elements (e.g., jobs, workflows, tables, etc.). Recall that the metadata system 160 can be configured to leverage domain knowledge as well as specific information regarding the architecture of the computing cluster 135. This information can similarly be applied to optimize various design-time elements (e.g., jobs, workflows, tables, etc.) for operation in a particular environment. The metadata system may be configured to optimize (automatically or through recommendations) design-time elements to, for example, improve processing efficiency, data storage efficiency, or any other performance metrics. The process of optimizing a given workflow may involve re-designing the structure of the workflow, for example, by changing or modifying the data processed according to the workflow (e.g., selecting different stored data sets or transforming the stored data sets), changing the sequencing and/or scheduling of data processing jobs involved in the workflow, and/or changing one or more of the services utilized to store and process the data involved in the workflow (e.g., using Apache Impala™ instead of Apache Hive™). As an illustrative example, the metadata system 160 may analyze a recreated workflow involving multiple jobs and, using its domain knowledge and information regarding the architecture of computing cluster 135, determine that the same (or better) results can be achieved by, for example, applying a de-normalizing operation to join or flatten several tables involved in the workflow and migrate the tables to a different service (e.g., from Apache Hive™ to Apache Impala™). Notably, with its domain knowledge, information regarding the architecture of the computing cluster 135, and inferred design-time information, the metadata system 160 is able to optimize heterogeneous design-time elements such as workflows involving multiple different services (e.g., MapReduce™, Apache Hive™, Apache Impala™, etc.) performing multiple different jobs.

Figure 11:
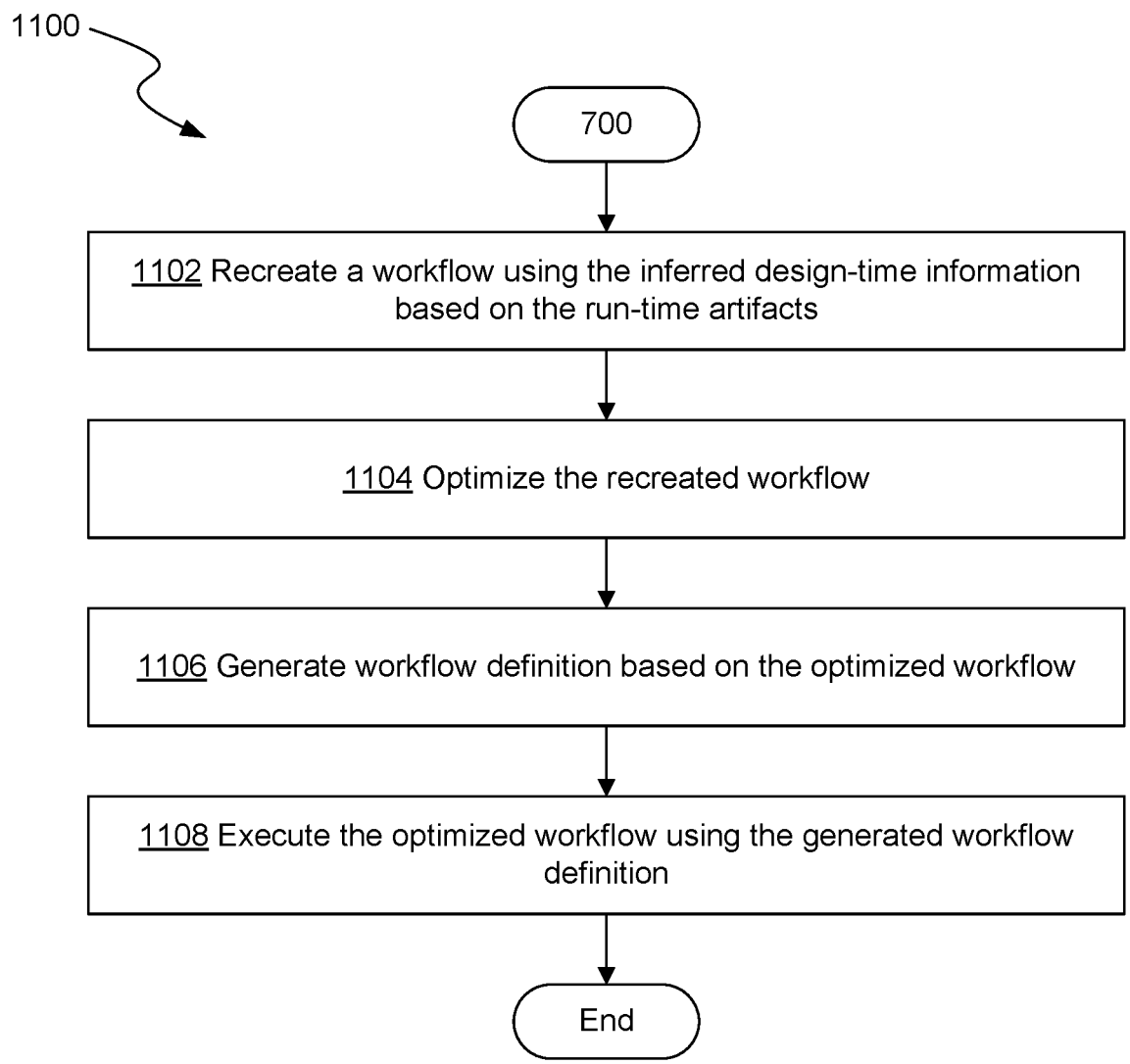
FIG. 11 is a flow chart that describes an example process for optimizing a workflow based on extracted run-time metadata.

FIG. 11 shows a flow chart describing an example process 1100 for optimizing a design-time element such as workflow. The example process 1100 is described with respect to the example system architecture depicted in FIG. 4B. A person having ordinary skill will recognize that the architecture of the system may differ in other embodiments. For example, the technique for versioning design-time elements can similarly be implemented using any of the system architectures depicted in FIGS. 5A-5C. As with the example process 800, one or more steps of the example process 1100 may be performed by any one or more of the components of the example processing system 1600 described with respect to FIG. 16. For example, the example process 1100 depicted in FIG. 11 may be represented in instructions stored in memory that are then executed by a processing unit. The process 1100 described with respect to FIG. 11 is an example provided for illustrative purposes and is not to be construed as limiting. Other processes may include more or fewer steps or may perform steps in a different order than depicted in FIG. 11 while remaining within the scope of the present disclosure. Note that the example process 1100 is described in the context of optimizing workflows but may similarly be applied to optimizing other types of design-time elements such as jobs, tables, etc. As indicated in FIG. 11, the example process may continue from the example process 700 of FIG. 7.

The example process 1100 begins at step 1102 with recreating a workflow using inferred design-time information based at least in part on run-time artifacts. The example process 1100 continues at step 1104 with optimizing the recreated workflow, for example, by using domain knowledge and information regarding the architecture of the computing cluster 135. The example process 1100 continues at step 1106 with generating a workflow definition of the optimized workflow, for example, similar to as described with respect to step 804 in example process 800. The example process 1100 continues at step 1108 with executing the optimized workflow using the workflow definition generated at step 1106, for example, similar to as described with respect to step 806 in example process 800.

Data Lineage Across Multiple Computing Clusters

In some embodiments, the metadata system 160 can be configured to track data lineage across multiple computing clusters (e.g., multiple transient computing clusters 535*a-n* in a cloud-based computing environment 504 as described with respect to FIGS. 5A-5C) based on operational metadata generated in the clusters. For example, an enterprise or other organization may invoke transient computing clusters 535*a-n* in a cloud-based computing environment 504 (public or private) to run workflows including one or more jobs or other tasks to process data. These transient computing clusters 535*a-n* are then destroyed after the one or more jobs or tasks are completed. Destruction of the transient computing clusters 535*a-n* after completion of processing task typically means that any metadata generated based on the processing is typically lost as well. Loss of such metadata makes it difficult for the enterprise or organization to gain insight into how their data propagates across these multiple transient computing clusters. However, an architecture similar to as described with respect to FIGS. 5A-5C, enables a metadata system 160 to extract and consolidate metadata generated from the transient cloud-based computing clusters 535*a-n*. The metadata system can then process the metadata to track data lineage. Based on this data lineage, the metadata system 160 summarizes operations at the cluster level and can also identify relationships between the multiple computing clusters 535*a-n*. Specifically, the metadata system 160 may be configured to, for example, identify dependencies and/or redundancies between jobs included in certain workflows run across the multiple transient computing clusters. Information regarding such dependencies and/or redundancies can then be utilized, for example, to guide the provisioning of such transient computing clusters 535*a-n* and/or the scheduling of jobs performed in the clusters to effectuate more efficient usage of computing resources. Further, within this information redundancies in the form of duplicate jobs performed can be identified within or across workflows and can be de-duplicated to save computing resources.

Figure 12:
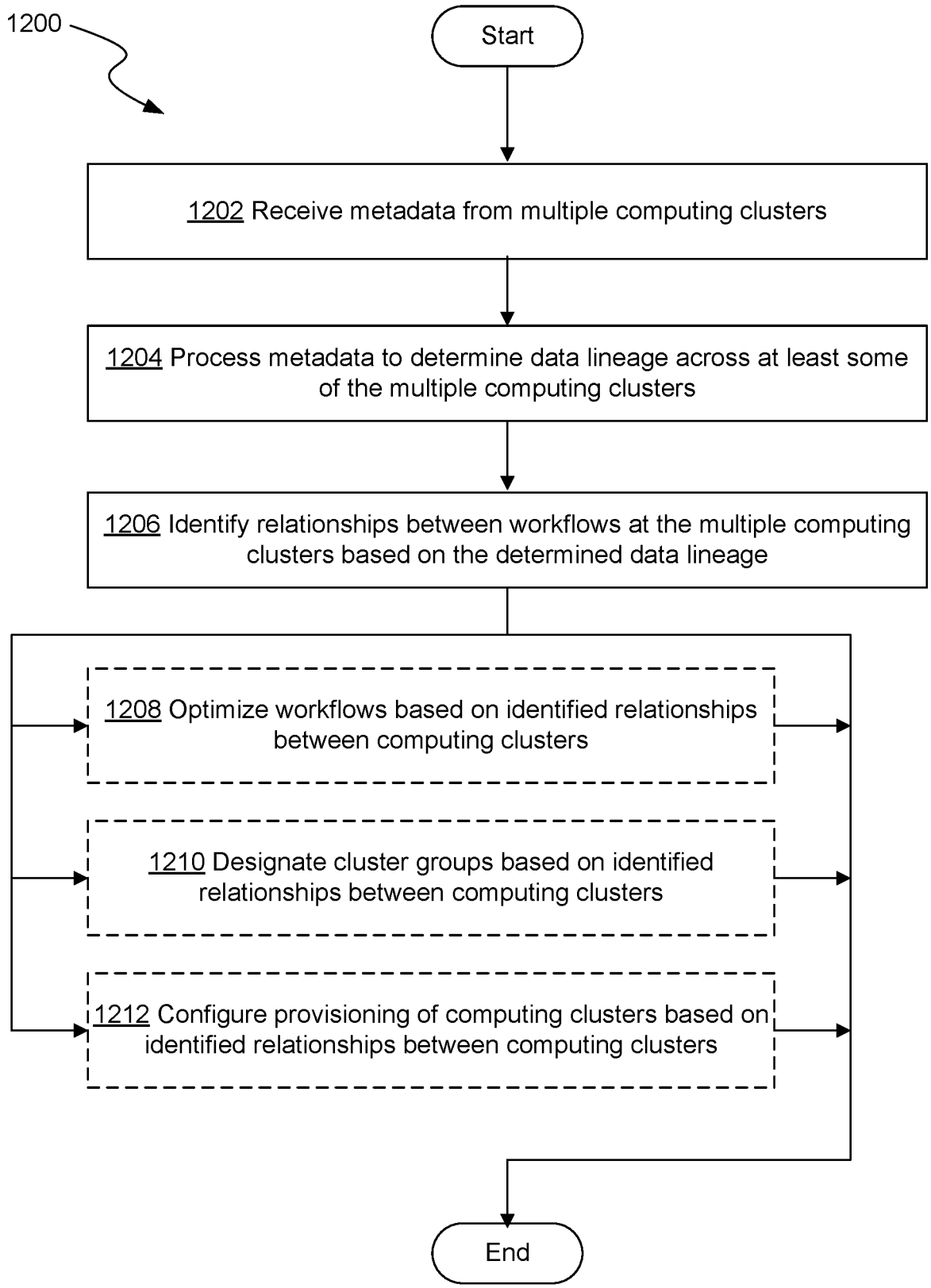
FIG. 12 is a flow chart that describes an example process for determining data lineage across multiple computing clusters.

FIG. 12 shows a flow chart describing an example process 1200 for determining data lineage across multiple computing clusters. The example process 1200 is described with respect to the example system architecture depicted in FIGS. 5A-5C. A person having ordinary skill in the relevant technology will recognize that the architecture of the system may differ in other embodiments. One or more steps of the example process 1200 may be performed by any one or more of the components of the example processing system 1600 described with respect to FIG. 16. For example, the example process 1200 depicted in FIG. 12 may be represented in instructions stored in memory that are then executed by a processing unit. The process 1200 described with respect to FIG. 12 is an example provided for illustrative purposes and is not to be construed as limiting. Other processes may include more or fewer steps or may perform steps in a different order than depicted in FIG. 12 while remaining within the scope of the present disclosure.

The example process 1200 begins at step 1202 with receiving metadata from multiple computing clusters. For example, step 1202 may involve receiving, by a metadata system 160, metadata from the telemetry publishers 555*a-n* at multiple transient computing clusters 535*a-n* in a cloud computing environment 504 as described with respect to FIGS. 5A-5C.

Process 1200 continues at step 1204 with processing the received metadata to track or otherwise determine data lineage across at least some of the multiple computing clusters from which the metadata originates. As described with respect to the example process 700 in FIG. 7, the step of processing the metadata to determine data lineage may include first indexing the metadata, then processing the indexed metadata to identify entities involved in the processing of the data in the computing clusters and relationships between the entities, and then generating data lineage information based on the identified entities and entity relationships.

Returning to FIG. 12, process 1200 continues at step 1206 with identifying relationships between workflows and/or jobs included in workflows based on the determined data lineage. Relationships between workflows may include, for example, workflow dependencies which are described with respect to FIG. 13 and/or redundant jobs or other tasks which are described with respect to FIG. 14.

The example process 1200 may continue with the metadata system performing some sort of action in response to identifying the relationships between workflows across the multiple computing clusters. For example, in some embodiments, the metadata system 160 may be configured to, at step 1208, optimize workflows based on identified relationships between workflows run in the multiple computing clusters. Optimization of workflows at step 1208 may include steps similar to those described with respect to the flow chart of FIG. 11 including generating workflow definitions based on the optimizations. In some embodiments, optimization of workflows may include eliminating identified redundancies, where possible. For example, a first daily workflow run on a first cluster may include a sequence of jobs 1, 2, 5, 7, and 9, while a second daily workflow run on a second cluster may include a sequence of jobs 1, 2, 7, and 10. In such a situation, the metadata system 160 may identify a redundancy in the jobs 1, 2, and 7, each of which are performed twice daily (once at each cluster). The metadata system 160 may take further steps (e.g., through generating a new workflow definition file or generating an output to a user with a design recommendation) to change the scheduling of jobs and/or provisioning of clusters to eliminate the redundancies, thereby saving computing resources and cost for the enterprise or organization. In the above example, an optimal workflow may include processing jobs 1, 2, and 7 at a first cluster and processing jobs 5, 9, and 10 at a second cluster, or processing all of jobs 1, 2, 5, 7, 9, and 10 in the same cluster, thereby saving the processing costs attributable to having to process jobs 1, 2, and 7 twice. Alternatively, certain jobs that are not dependent on each other may be parallelized, for example, by running them on separate clusters at the same time, thereby reducing the time to complete processing. A person having ordinary skill in the art will recognize that these are just a few examples of how workflows can be optimized.

In some embodiments, the metadata system 160 may be configured to, at step 1210, designate cluster groups based on identified relationships between clusters and the jobs being run on the clusters. For example, transient clusters periodically provisioned (e.g., daily, weekly, monthly, etc.) to process periodic workload (e.g., daily reports) may be related to other clusters that are similarly provisioned periodically. In such situations, the metadata system 160 may designate cluster groups (e.g., daily, weekly, monthly cluster groups) and generate outputs based on these designations (e.g., visualizations) that help the user better understand how cloud-based computing clusters are being utilized on periodic basis. Cluster groups may be designated based on other criteria as well such as by department in an enterprise setting, by geographical location (of the users, data, clusters, etc.), by data type, or by any other criteria.

In some embodiments, the metadata system 160 may be configured to, at step 1212, configure or re-configure the provisioning of transient computing clusters 535*a-n* in the cloud computing environment 504. For example, step 1212 may include rescheduling when transient computing clusters are provisioned, reassigning certain workload to certain clusters, migrating data, or otherwise changing the way in which transient computing clusters are provisioned to process data. In some embodiments, the step of configuring the provisioning of transient computing clusters may be performed as part of the optimization process described with respect to FIG. 12.

Figure 13:
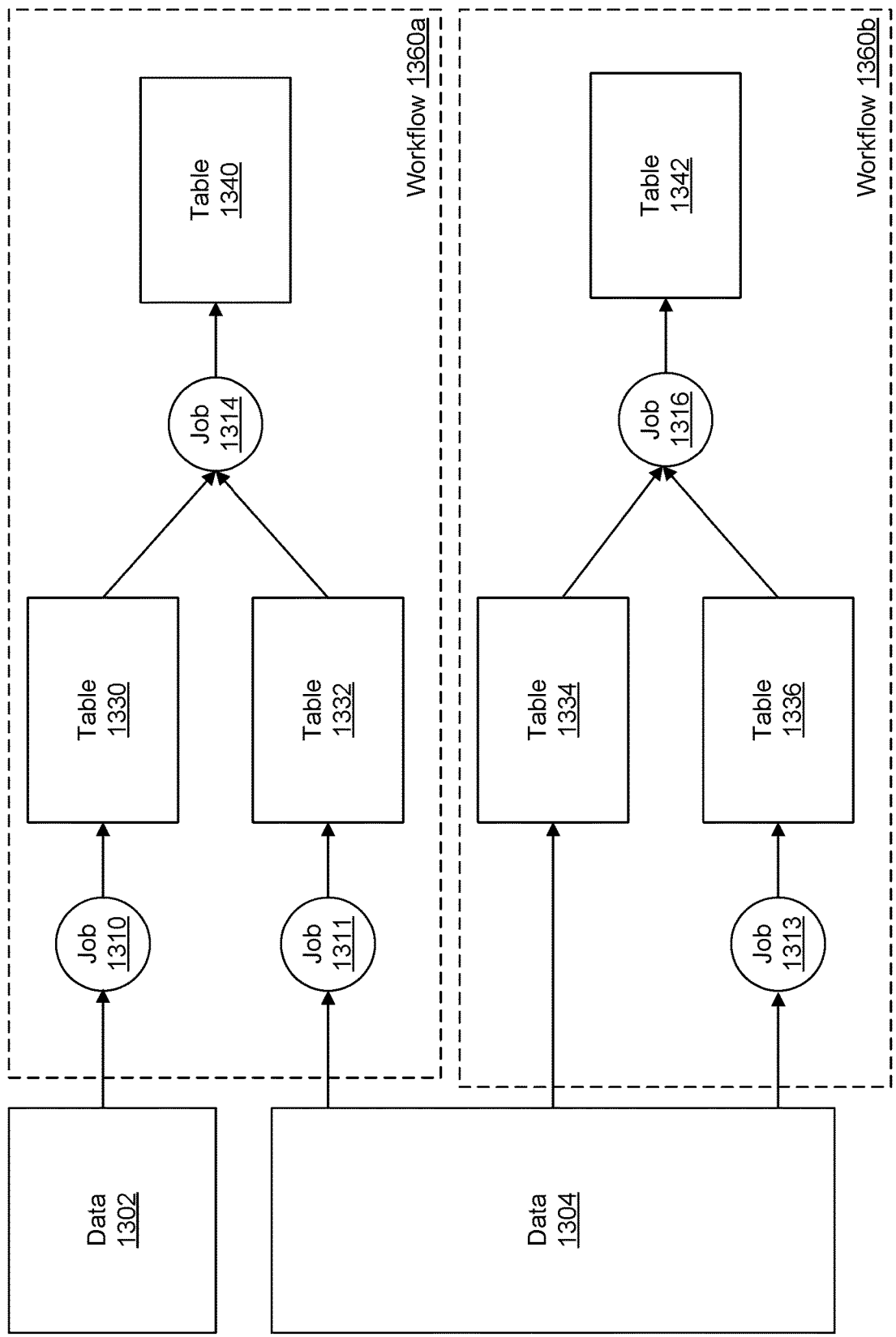
FIG. 13 is a diagram illustrating the detection of dependencies between workflows across multiple computing clusters.

FIG. 13 shows an example scenario that illustrates dependencies between workflows across multiple computing clusters. FIG. 13 shows a set of two example workflows 1360*a* and 1360*b* applied to process data from two data sources 1302 and 1304 to produce two tables 1340 and 1342. In the illustrative example, the two tables 1340, 1342 are generated by performing multiple jobs on the data from sources 1302 and/or 1304. Specifically, in the example first workflow 1360*a*, a job 1310 is executed using source data 1302 to produce a temporary intermediate table 1330 and job 1311 is executed using source data 1304 to produce a temporary intermediate table 1332. A job 1314 is then executed using the temporary intermediate tables 1330 and 1332 to produce the first table 1340. In the example second workflow 1360*b*, a job 1313 is run using source data 1304 to produce a temporary intermediate table 1336. Another job 1316 is then run using the temporary intermediate table 1336 and a table 1334 from source 1304 to produce the second table 1342. The jobs 1310-1314 and 1316 included in the two workflows 1360*a-b* may have been run in multiple different computing clusters, for example, multiple different transient computing clusters 535*a-n* in a cloud computing environment 504. For the purpose of clarity, it is assumed that the first workflow 1360*a* was performed in a first transient computing cluster 535*a* and the second workflow 1360*b* was performed in the second transient computing cluster 535*b*. Note that the jobs included in these workflows 1360*a-b* may have been performed in parallel and/or at different times.

By processing the metadata generated by the one or more services (e.g., MapReduce™, Apache Hive™, Apache Impala™, etc.) running the jobs of workflows 1360*a-b*, a metadata system 160 can determine data lineage and from the data lineage may infer the structure of the workflows 1360*a-b*. As an illustrative example, a metadata system 160 may infer or otherwise determine, based on the data lineage, that the table 1334 used as part of the second workflow 1360*b* is actually the same table 1340 produced as a result of the first workflow 1360*a*. Based on this assumption, the metadata system can then infer or otherwise identify a dependency relationship between the first workflow 1360*a* and the second workflow 1360*b*. Specifically, in this example, the second workflow 1360*b* depends on the successful completion of the first workflow 1360*a*.

Figure 14:
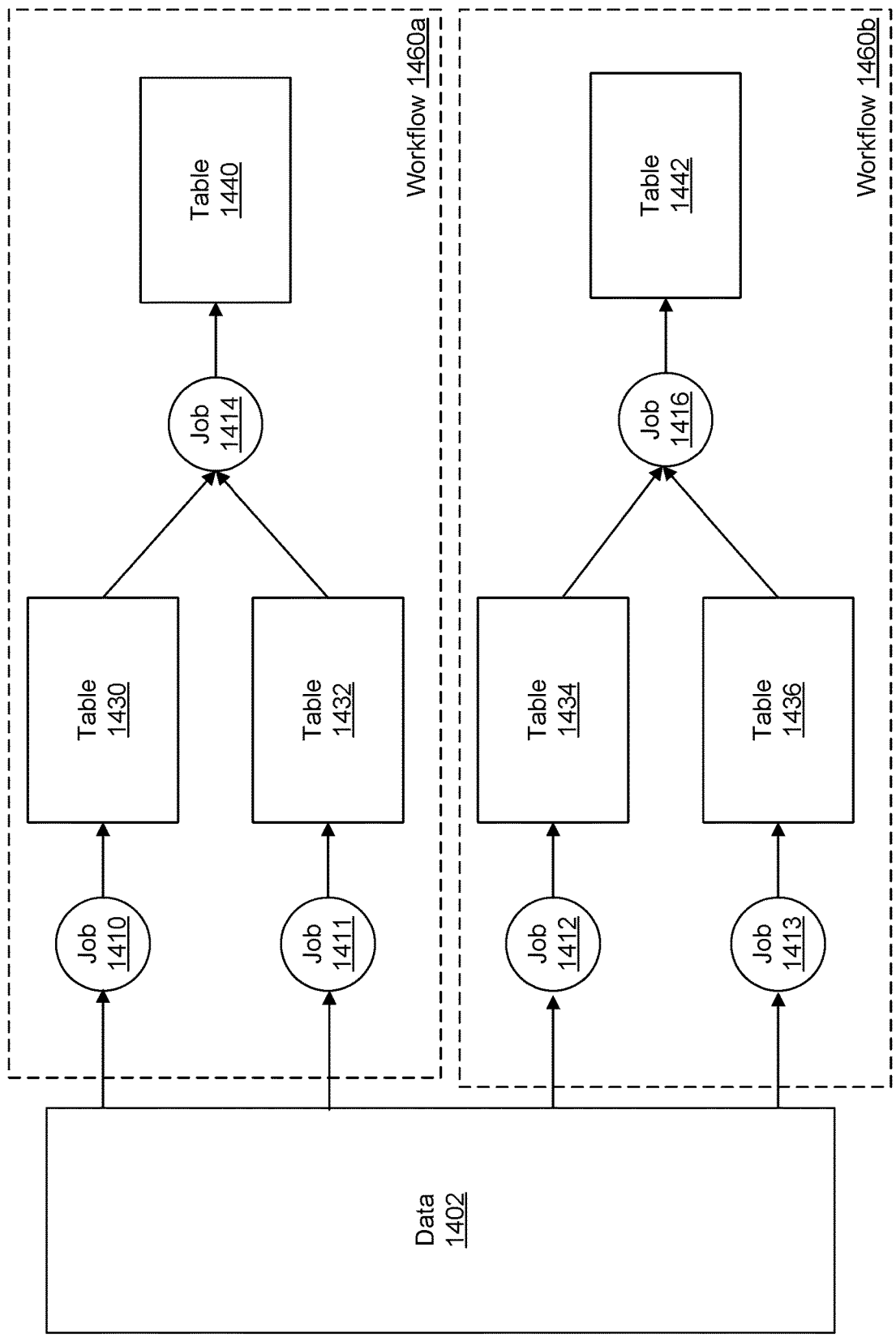
FIG. 14 is a diagram illustrating the detection of redundancies between workflows across multiple computing clusters.

FIG. 14 shows an example scenario that illustrates redundancies between workflows across multiple computing clusters. FIG. 14 shows a set of two example workflows 1460*a* and 1460*b* applied to process data from source 1402 to produce two tables 1440 and 1442. In the illustrative example, the two tables 1440, 1442 are generated by performing multiple jobs on the data from source 1402. Specifically, in the example first workflow 1460*a*, a job 1410 is executed using source data 1402 to produce a temporary intermediate table 1430 and job 1411 is executed using source data 1402 to produce a temporary intermediate table 1432. Another job 1414 is then executed using the two temporary intermediate tables 1430 and 1432 to produce the first table 1440. In the second example workflow 1460*b*, job 1412 is executed using source data 1402 to produce a temporary intermediate table 1434 and job 1413 is executed using source data 1402 to produce temporary intermediate table 1436. Another job 1416 is then run using the temporary intermediate tables 1434 and 1436 to produce the second table 1442. The jobs 1410-1414 and 1416 included in the two workflows 1460*a-b* may have been run in multiple different computing clusters, for example, multiple different transient computing clusters 535*a-n* in a cloud computing environment 504. For the purpose of clarity, it is assumed that the first workflow 1460*a* was performed in a first transient computing cluster 535*a* and the second workflow 1460*b* was performed in the second transient computing cluster 535*b*. Note that the jobs included in these workflows 1460*a-b* may have been performed in parallel and/or at different times.

By processing the metadata generated by the one or more services (e.g., MapReduce™, Apache Hive™, Apache Impala™, etc.) running the jobs of workflows 1460*a-b*, a metadata system 160 can determine data lineage and from the data lineage may infer the structure of the workflows 1460*a-b*. As an illustrative example, a metadata system 160 may infer or otherwise determine, based on the data lineage, that jobs of workflow 1460*a* are similar to the jobs of workflow 1460*b*. Consider, for example, a scenario involving an enterprise or other organization that runs two workflows to compute company profits for two different geographical regions. The workflows run to process the underlying source data 1402 may be essentially the same (e.g., including similar sequencing of similar jobs) except that the two workflows are run at different times using different transient clusters. In such a situation, the metadata system 160 may determine that the workflows 1460*a-b* (or at least portions thereof) are redundant. The overall workflows need not be the same in order to identify redundancies. For example, redundancies can be found in the same or similar jobs performed in different computing clusters. Redundancies may also be identified in the data produced based on processing at multiple clusters. For example, by analyzing metadata gathered from the clusters running workflows 1460*a-b*, a metadata system may determine that tables 1440 and 1442 are the same (or at least similar) even if the underlying jobs used to generate the tables are different. These are just a few examples of redundancies that can be identified using a metadata system 160 with access to metadata from multiple computing clusters.

Example Data Lineage Visualizations

FIGS. 15A-15F show a series of example data lineage visualizations. The example data lineage visualizations depicted in FIGS. 15A-15F may be generated by a metadata system, based on generated lineage information as previously described. In some embodiments, data lineage visualizations may be displayed to users, for example, via clients 405. Such data lineage visualizations provide an efficient and intuitive way to convey information to a user (e.g., an administrator of the computing cluster or a data scientist) regarding the source of data being processed, the type of data being processed, operations performed on the data, movement of the data through the system, uses of the data, etc. For each data source, a data lineage visualization may be generated to display, down to the column level within that data source, what the precise upstream data sources were, the transforms performed to produce it, and the impact that data has on downstream artifacts.

Figure 15A:
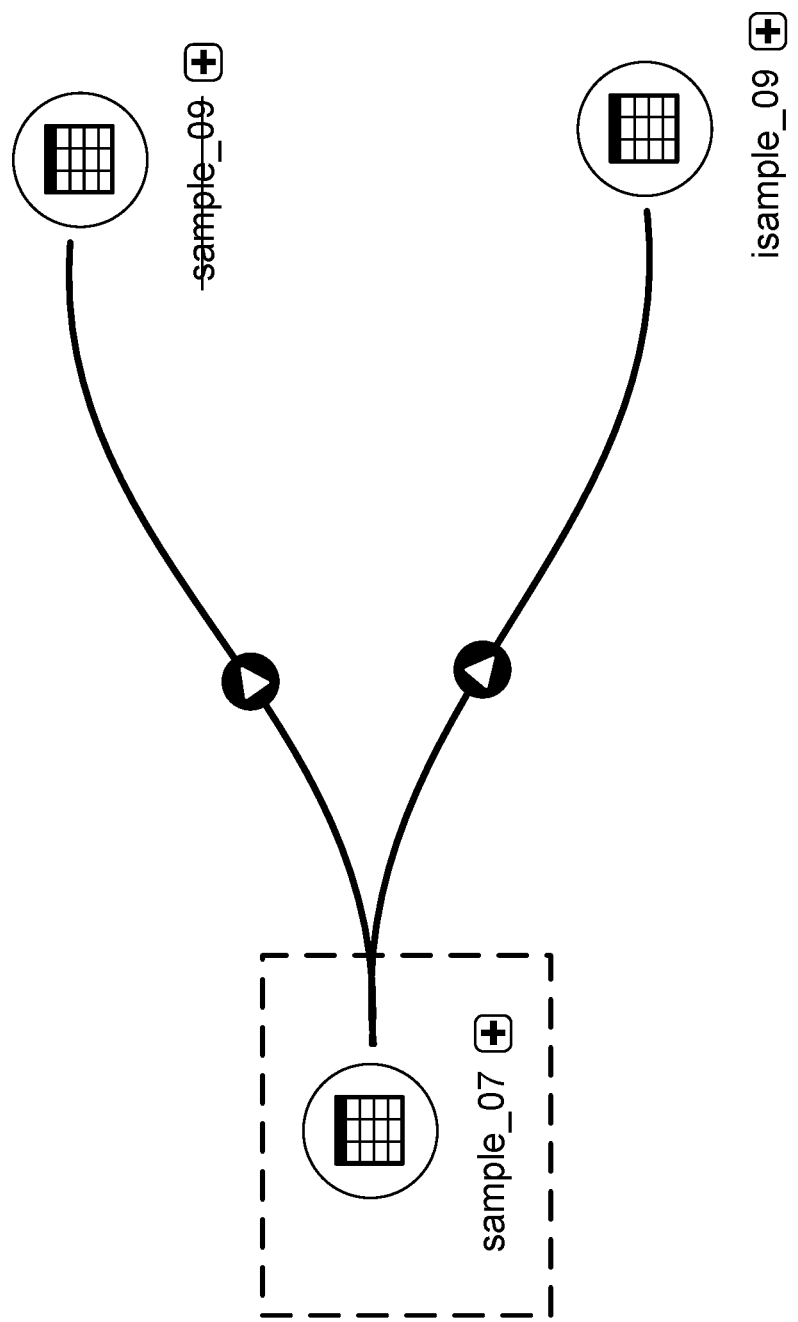
FIGS. 15A-15F show a series of example data lineage diagram visualizations.

FIG. 15A shows an example visualization of a simple data lineage. The simple data lineage depicted in FIG. 15A shows several entities linked based on entity relationships. Specifically, the simple data lineage shows dataflow links (indicated by the lines) between a sample_07 table, a sample_09 table and an isample_09 table. Specifically, as shown in FIG. 15A, the example visualization is in the form of a data linage diagram that includes multiple graphical entity nodes (or icons) representative of underlying entities. For example, each of the graphical entity nodes depicted in FIG. 15A may be representative of tables involved in a data processing flow. As is shown in FIG. 15D, other data lineage diagrams may include graphical entity nodes representative of other types of entities (e.g., jobs, queries, templates, etc.). The data lineage diagram shown in FIG. 15A further includes graphical edges linking the graphical entity nodes that are indicative of relationships between the entities represented by the graphical entity nodes. For example, the graphical edges depicted in the data lineage diagram of FIG. 15A may represent a data flow relationship between the tables represented by the graphical entity nodes.

Figure 15B:
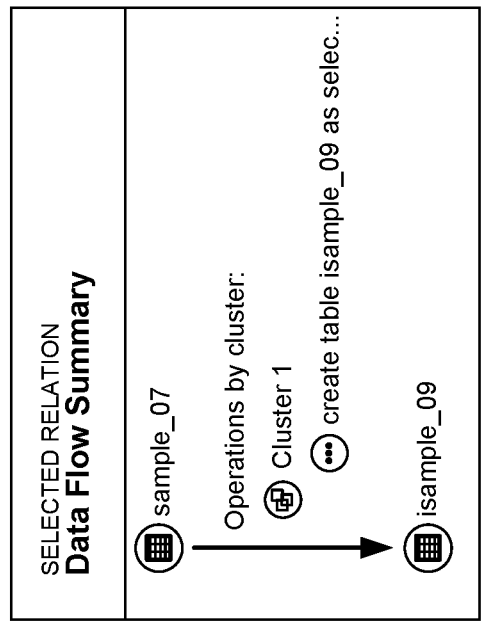
Figure 15B:
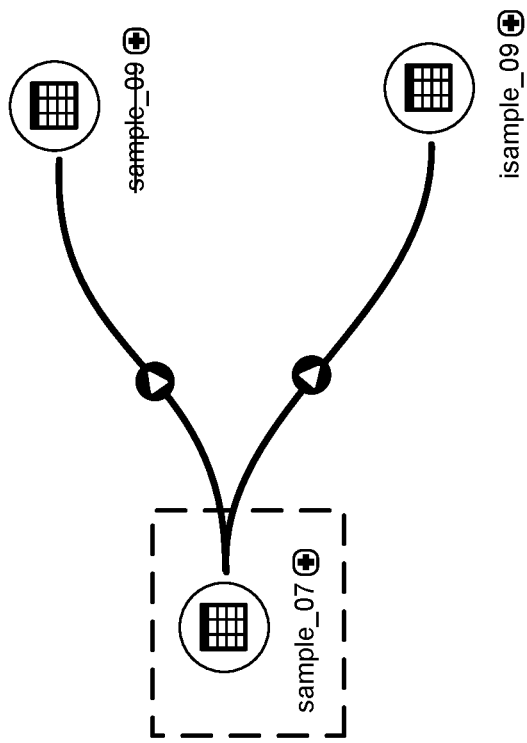

FIG. 15B shows another view of the data lineage visualization of FIG. 15A, but with additional information displayed regarding operations associated with the data flow relationship. In an embodiment, the operation information can be displayed to a user in response to the user selecting one or more of the graphical edges in the data lineage visualization. Here, a user has selected the graphical edge representative of the data flow link between the sample_07 table and the isample_09 table. As shown in FIG. 15B, the operation information indicates that the isampl_09 table was created from the sample_07 table in cluster 1.

Figure 15C:
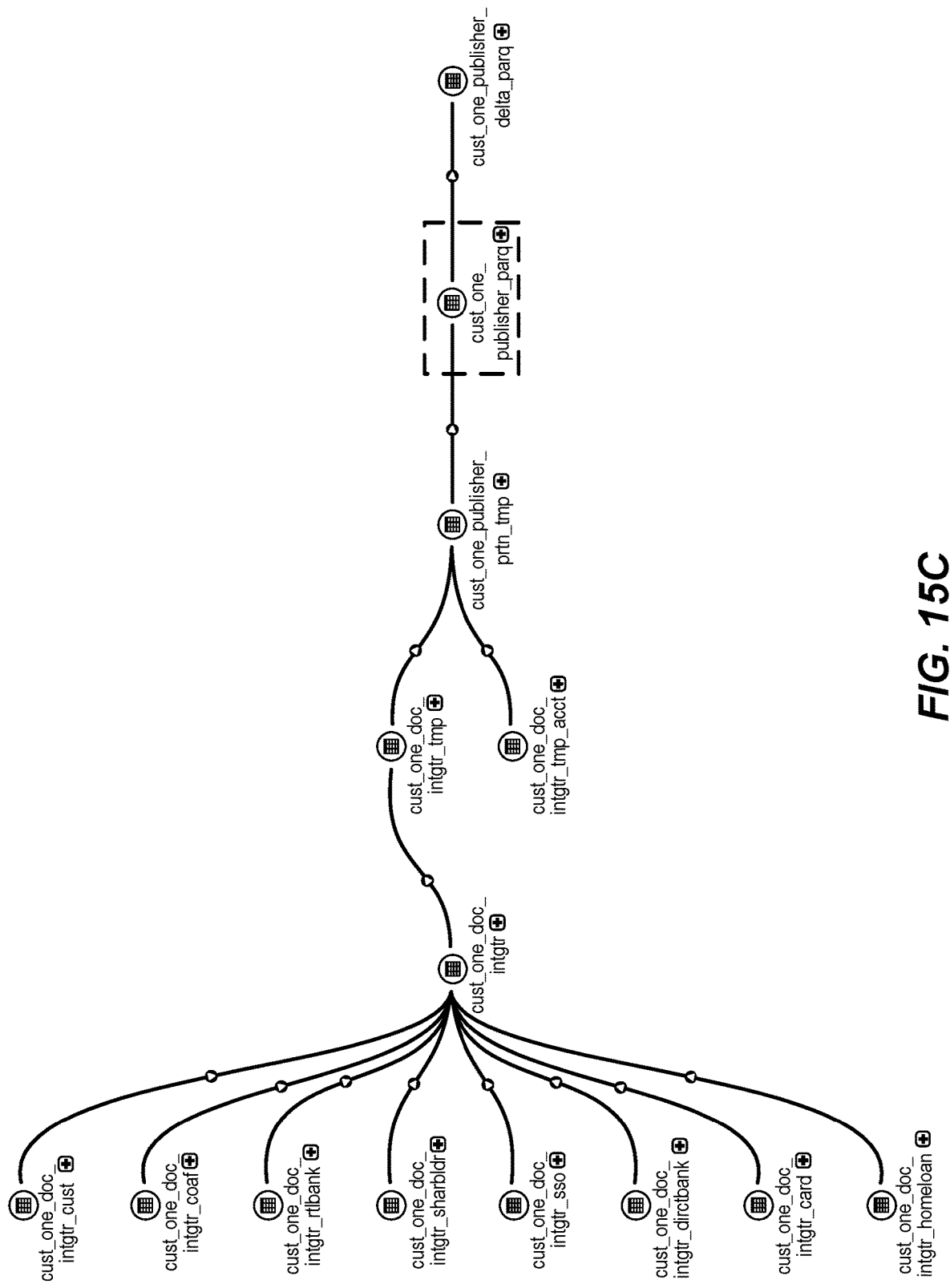
Figure 15D:
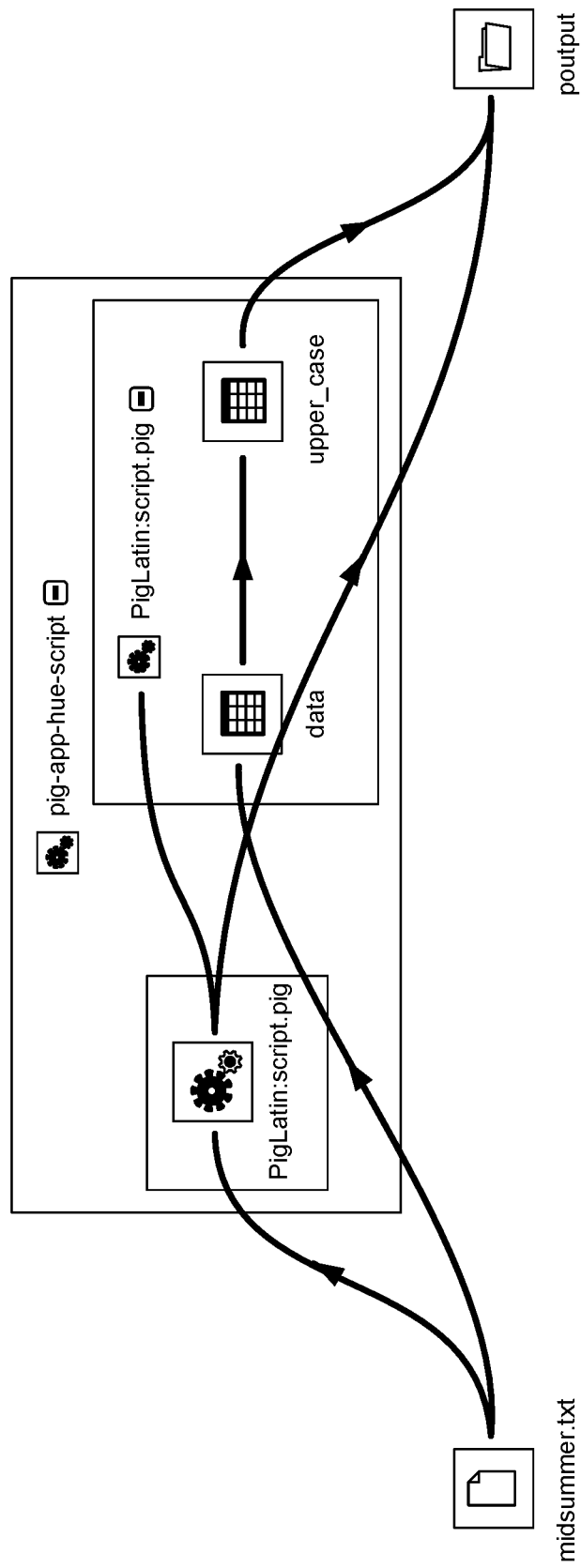

FIG. 15C shows an example visualization of a more complex real-world data lineage. As indicated shown in FIG. 15C, data lineage in a given system may involve many entities and entity relationships.

FIG. 15D shows another example visualization of a more complex data lineage that includes entities other than tables. The example data lineage depicted in FIG. 15D shows the processing of several tables generated from a source data file using a script (e.g., an Apache Pig™ script) to generate an output. As shown in FIG. 15D, the data lineage visualization may display data flow relationship links (e.g., between the source file and generated tables) as well as instance or parent-child relationships (e.g., between a script template and script instance based on the template). For example, in some embodiments, a graphical entity node representative of a parent entity may be expanded, in response to user interaction, to display a graphical entity node representative of a child entity to the patent.

Figure 15E:
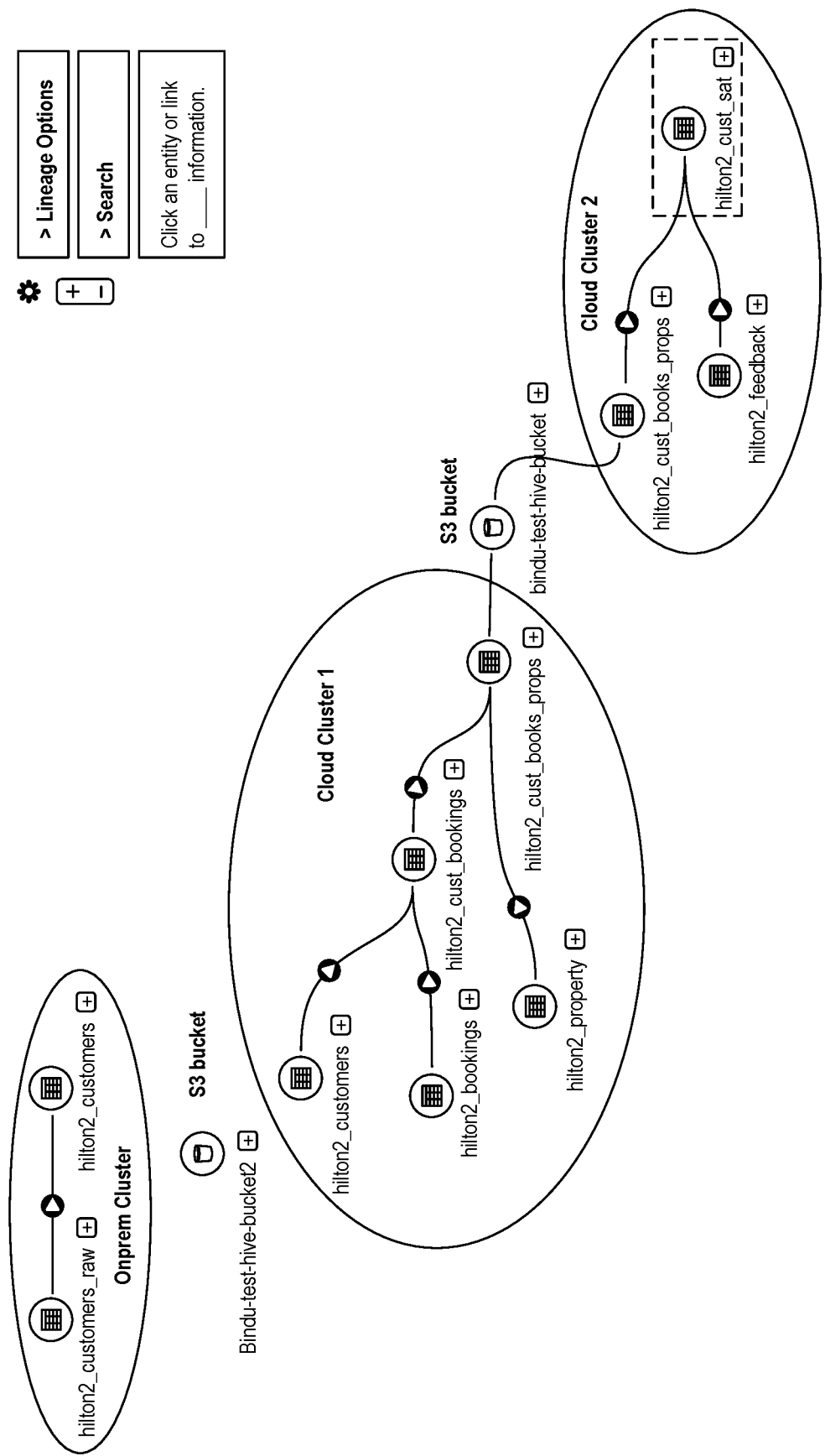

FIG. 15E shows another example visualization of data lineage that includes information regarding specific computing clusters in which certain entities reside and/or operations take place. For example, the visualization of data lineage depicted in FIG. 15E shows lineage across multiple clusters including a premises computing cluster and a first and second cloud-based computing cluster. A visualization showing data lineage across multiple clusters provides important information to a user such as how clusters are provisioned to process certain workflows, relationships between clusters and workflows (e.g., dependencies and/or redundancies), where data resides as it is processed, etc. Such information can then be used, for example, to monitor regulatory compliance, optimize the provisioning of clusters and/or scheduling of jobs/tasks within the clusters, optimize workflows, etc.

Figure 15F:
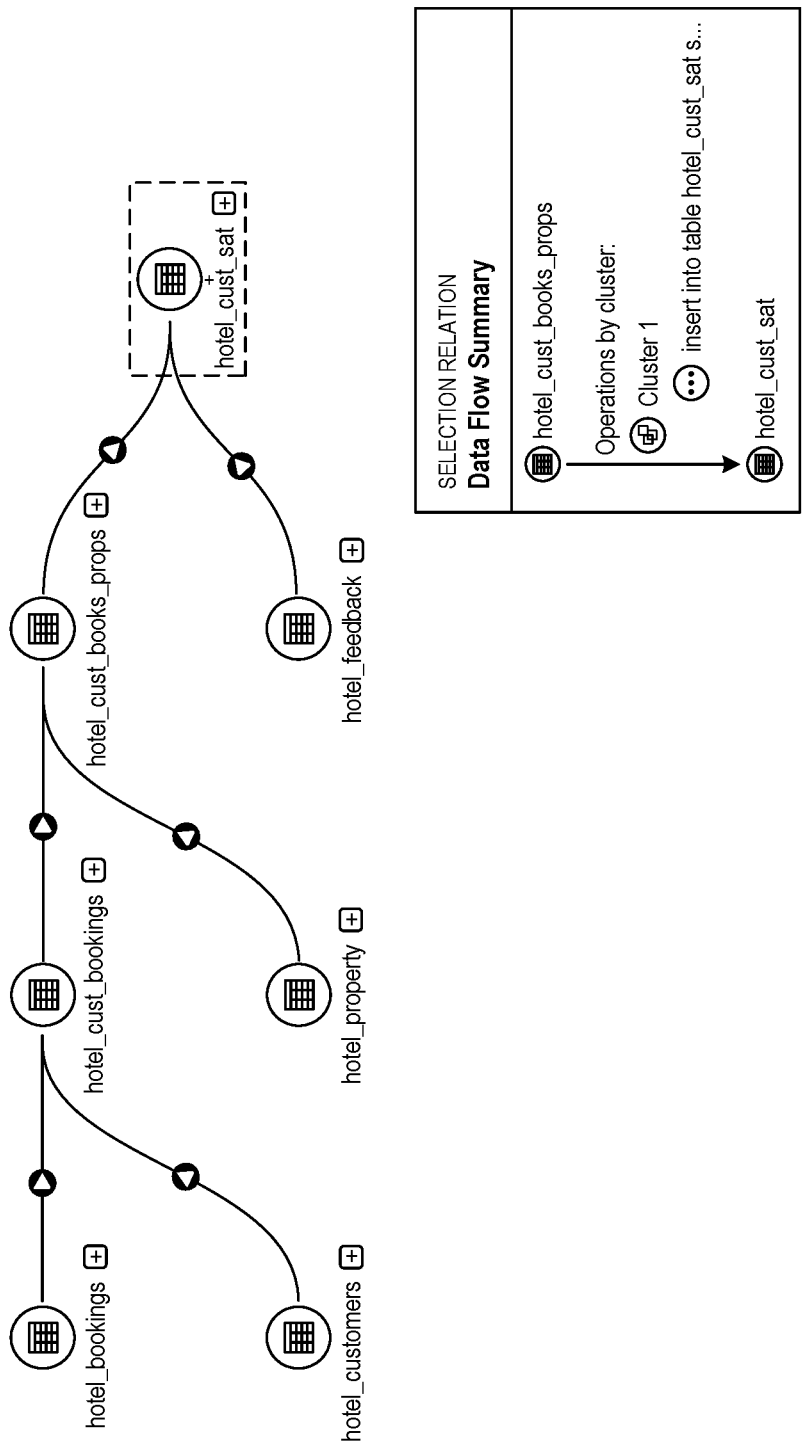

Entities and operations associated with each of the different clusters are identified in FIG. 15E by lines encircling the representative nodes; however, this is provided as an example and is not to be construed as limiting. Other embodiments may identify cluster relationships differently, for example, using labels, color codes, alternative arrangement of nodes, etc. Additional information can be displayed regarding various entities involved in the data lineage, for example, through user interaction as described with respect to FIG. 15B. For example, FIG. 15F shows an example detail of the data lineage visualization of FIG. 15E in which a user has selected a particular operation involved in the data flow between the table "hotel_cust_books_props" and "hotel_cust_sat." As shown in FIG. 15F, the user interaction may cause a data flow summary to be displayed that identifies the operation (in this case an INSERT operation) linking the two tables as well as an identification of which cluster executed the operation. As previously discussed, the data lineage across multiple clusters underlying a visualization such as the example provided in FIGS. 15E-15F, may be generated based on metadata gathered using an architecture similar to that described with respect to FIGS. 5A-5C.

The example data lineage visualizations depicted in FIGS. 15A-15F are provided for illustrative purposes and are not to be construed as limiting. A person having ordinary skill will recognize the lineage information may be presented (visually or otherwise) in using other arrangements.

Example Computer Implementation

Figure 16:
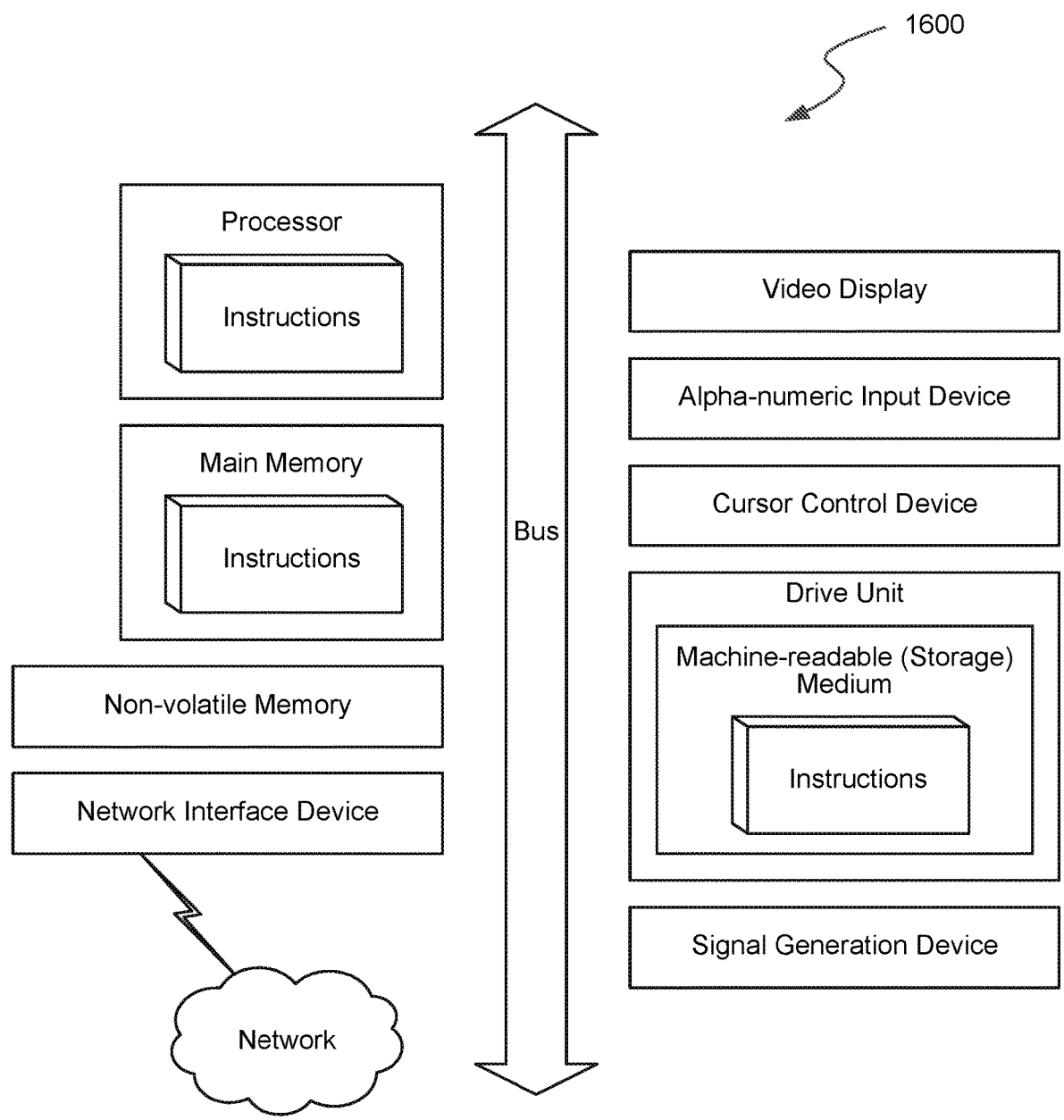
FIG. 16 shows a diagrammatic representation of a machine in the example form of a computer system within which a set of instructions, for causing the machine to perform any one or more of the techniques discussed herein, may be executed.

FIG. 16 shows a diagrammatic representation of a machine in the example form of a computer system within which a set of instructions, for causing the machine to perform any one or more of the techniques discussed herein, may be executed.

In the example of FIG. 16, the computer system 1600 includes a processor, memory, non-volatile memory, and an interface device. Various common components (e.g., cache memory) are omitted for illustrative simplicity. The computer system 1600 is intended to illustrate a hardware device on which any of the components depicted FIGS. 1-5B (and any other components described in this specification) can be implemented. The computer system 1600 can be of any applicable known or convenient type. The components of the computer system 1600 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer system 1600. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 16 reside in the interface.

In operation, the computer system 1600 can be controlled by operating system software that includes a file management system, such as a disk operating system. One example of operating system software with associated file management system software is the family of operating systems known as Windows™ from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

DISCLAIMERS

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct a more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disc Read-Only Memory (CD-ROMS), Digital Versatile Discs, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above detailed description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents, applications, and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above detailed description. While the above disclosure describes certain embodiments, and describes the best mode contemplated, no matter how detailed the above appears in text, the teachings can be practiced in many ways. Implementation details of disclosed embodiments may vary considerably, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A method comprising:
receiving first metadata from a first transient computing cluster, the first transient computing cluster temporarily provisioned to process data according to a first workflow, the first metadata including run-time artifacts generated at a time of processing the data according to the first workflow;
processing the first metadata to generate first design-time information associated with the first workflow, the first design-time information indicative of a design of the first transient computing cluster, the first workflow, and/or one or more data processing jobs included in the first workflow;
wherein the first design-time information associated with the first workflow is based on a data lineage information associated with the first workflow, the data lineage information indicative of a path of data through one or more entities involved in the processing of the data according to the first workflow; and
generating relationship data based on the first design-time information so as to obtain an input that adjusts the first workflow.

2. The method of claim 1, wherein the relationship data generated identifies a dependency and/or redundancy of the first workflow.

3. The method of claim 1, further comprising:
adjusting the first workflow according to the input.

4. The method of claim 1, wherein processing the first metadata to generate the first design-time information includes:
generating the data lineage information associated with the first workflow based on the first metadata.

5. The method of claim 1, wherein processing the first metadata to generate the first design-time information includes:
inferring, based on the data lineage information associated with the first workflow, logical connections between the one or more data processing jobs.

6. The method of claim 5, wherein the logical connections include:
sequencing of the data processing jobs;
scheduling of the data processing jobs;
dependencies between the data processing jobs; and/or
common parameters between the data processing jobs.

7. The method of claim 1, wherein the relationship data generated identifies a dependency and/or redundancy between the first workflow and a second workflow.

8. The method of claim 7, further comprising:
adjusting the second workflow according to the input.

9. The method of claim 1, wherein the first design-time information includes:
data processed according to the first workflow;
operations performed on the data as part of the first workflow; and/or
services of the first transient computing cluster utilized to perform the operations on the data according to the first workflow.

10. A system comprising:
one or more processors; and
a memory having instructions stored thereon, which when executed by the one or more processors, cause the system to:
receive first metadata from a first transient computing cluster, the first transient computing cluster temporarily provisioned to process data according to a first workflow, the first metadata including run-time artifacts generated at a time of processing the data according to the first workflow;
process the first metadata to generate first design-time information associated with the first workflow, the first design-time information indicative of a design of the first transient computing cluster, the first workflow, and/or one or more data processing jobs included in the first workflow;
wherein the first design-time information associated with the first workflow is based on a data lineage information associated with the first workflow, the data lineage information indicative of a path of data through one or more entities involved in the processing of the data according to the first workflow; and
generate relationship data based on the first design-time information so as to obtain an input that adjusts the first workflow.

11. The system of claim 10, wherein the first transient computing cluster includes one or more temporarily provisioned virtual machine instances, wherein each of the one or more virtual machine instances is operable to:

extract metadata from the first transient computing cluster; and publish the extracted metadata to a queue, wherein the first metadata is received from the queue.

12. The system of claim 10, wherein the memory has further instructions stored thereon, which when executed by the one or more processors, cause the system to further:

designate, based on the relationship data, a cluster group that includes the first transient computing cluster.

13. The system of claim 10, wherein the memory has further instructions stored thereon, which when executed by the one or more processors, cause the system to further:

configure, based on the relationship data, provisioning of transient computing clusters to process the data according to the first workflow.

14. The system of claim 10, wherein processing the first metadata to generate the first design-time information includes:

identifying one or more entities involved in the processing of the data according to the first workflow and/or relationships between the identified one or more entities.

15. A non-transitory computer readable medium storing instructions, execution of which by a computer system, cause the computer system to:

receive first metadata from a first transient computing cluster, the first transient computing cluster temporarily provisioned to process data according to a first workflow, the first metadata including run-time artifacts generated at a time of processing the data according to the first workflow;

process the first metadata to generate first design-time information associated with the first workflow, the first design-time information indicative of a design of the first transient computing cluster, the first workflow, and/or one or more data processing jobs included in the first workflow;

wherein the first design-time information associated with the first workflow is based on a data lineage information associated with the first workflow, the data lineage information indicative of a path of data through one or more entities involved in the processing of the data according to the first workflow; and generate relationship data based on the first design-time information so as to obtain an input that adjusts the first workflow.

16. The non-transitory computer readable medium of claim 15, storing further instructions, execution of which by the computer system, cause the computer system to further:

cause display of a visualization based on the first design-time information, wherein the visualization including a plurality of graphical entity nodes involved in the processing of the data according to the first workflow, each of the plurality of graphical entity nodes visually linked to one or more of the other plurality of graphical entity nodes based on identified relationships between the plurality of entities.

17. The non-transitory computer readable medium of claim 16, wherein the visualization is further based on a second design-time information generated from second metadata.

18. The non-transitory computer readable medium of claim 16, wherein at least some of the plurality of graphical entity nodes include interactive elements, which when interacted with by a user, display information regarding an entity represented by the graphical entity node.

19. The non-transitory computer readable medium of claim 16, wherein a particular graphical entity node of the plurality of graphical entity nodes includes an indication that an entity represented by the particular graphical entity node is associated with the first transient computing cluster.

* * * * *